(12) United States Patent
Hill et al.

(10) Patent No.: US 6,452,682 B2
(45) Date of Patent: Sep. 17, 2002

(54) APPARATUS TO TRANSFORM TWO NONPARALLEL PROPAGATING OPTICAL BEAM COMPONENTS INTO TWO ORTHOGONALLY POLARIZED BEAM

(75) Inventors: Henry A. Hill, Tucson, AZ (US); Peter de Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/858,076

(22) Filed: May 15, 2001

Related U.S. Application Data

(63) Continuation of application No. 09/061,928, filed on Apr. 17, 1998, now Pat. No. 6,236,507.

(51) Int. Cl.$^7$ ............................................... G01B 9/02
(52) U.S. Cl. ........................ 356/493; 356/487; 356/450
(58) Field of Search ................................ 356/450, 487, 356/492, 493, 486

(56) References Cited

U.S. PATENT DOCUMENTS

| 4,684,828 A | 8/1987 | Sommargren ................ 307/425 |
| 4,687,958 A | 8/1987 | Sommargren ................ 307/425 |
| 4,688,940 A | 8/1987 | Sommargren et al. ...... 356/349 |
| 5,485,272 A | 1/1996 | Dirksen et al. ............. 356/349 |

*Primary Examiner*—Frank G. Font
*Assistant Examiner*—Andrew H. Lee
(74) *Attorney, Agent, or Firm*—Fish & Richardson P.C.

(57) ABSTRACT

The invention features systems and methods for generating optical beams having substantially orthogonal polarizations for use in distance measuring interferometry. In one embodiment, the invention features a system including a source which during operation generates two nonparallel propagating source beams; and a retarder element positioned to receive the two nonparallel propagating source beams and convert them into two nonparallel propagating output beams that are polarized substantially orthogonal to one another. The system can further include a birefringent prism positioned to receive the two nonparallel propagating output beams and produce two parallel output beams.

15 Claims, 16 Drawing Sheets

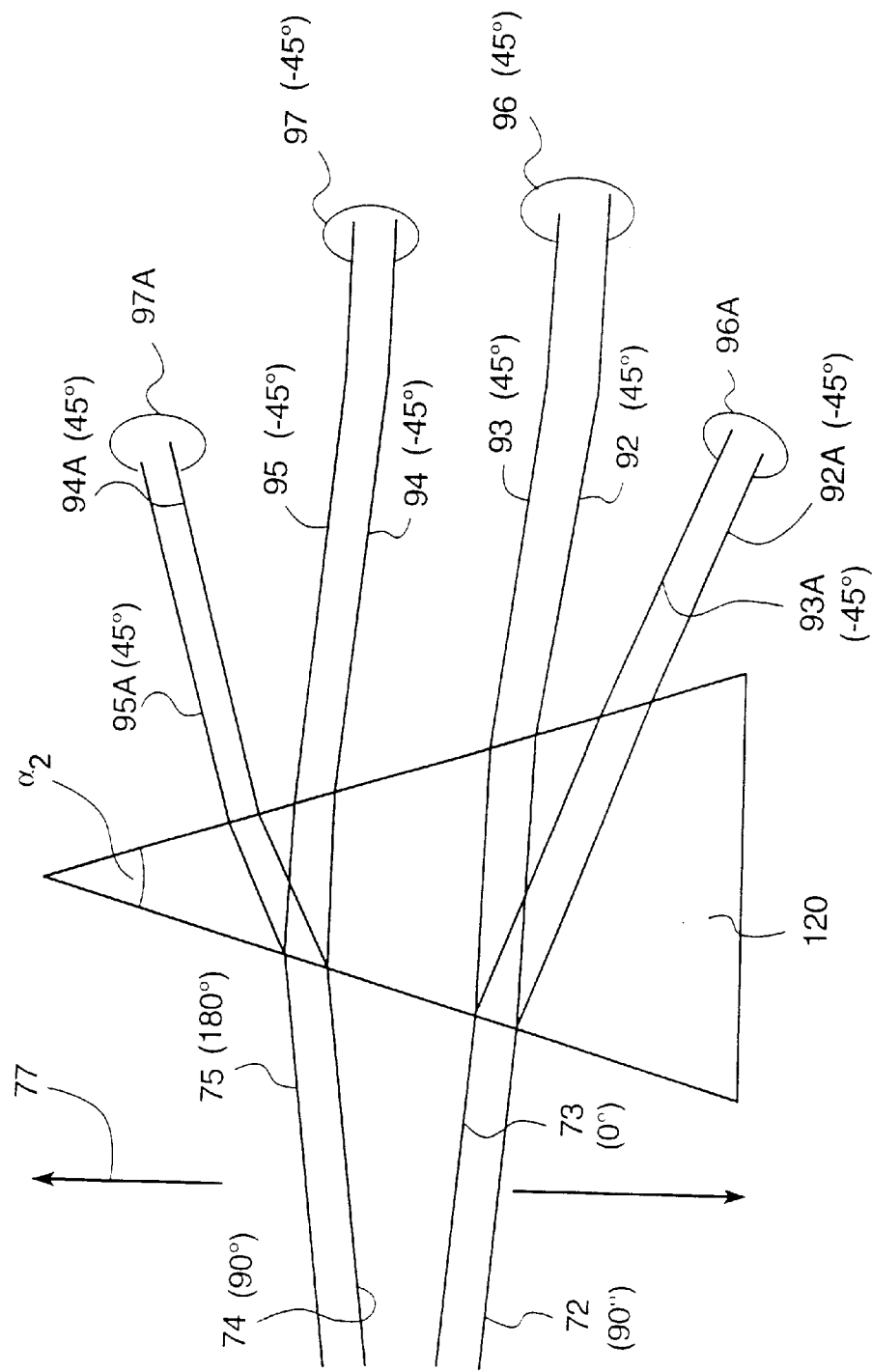

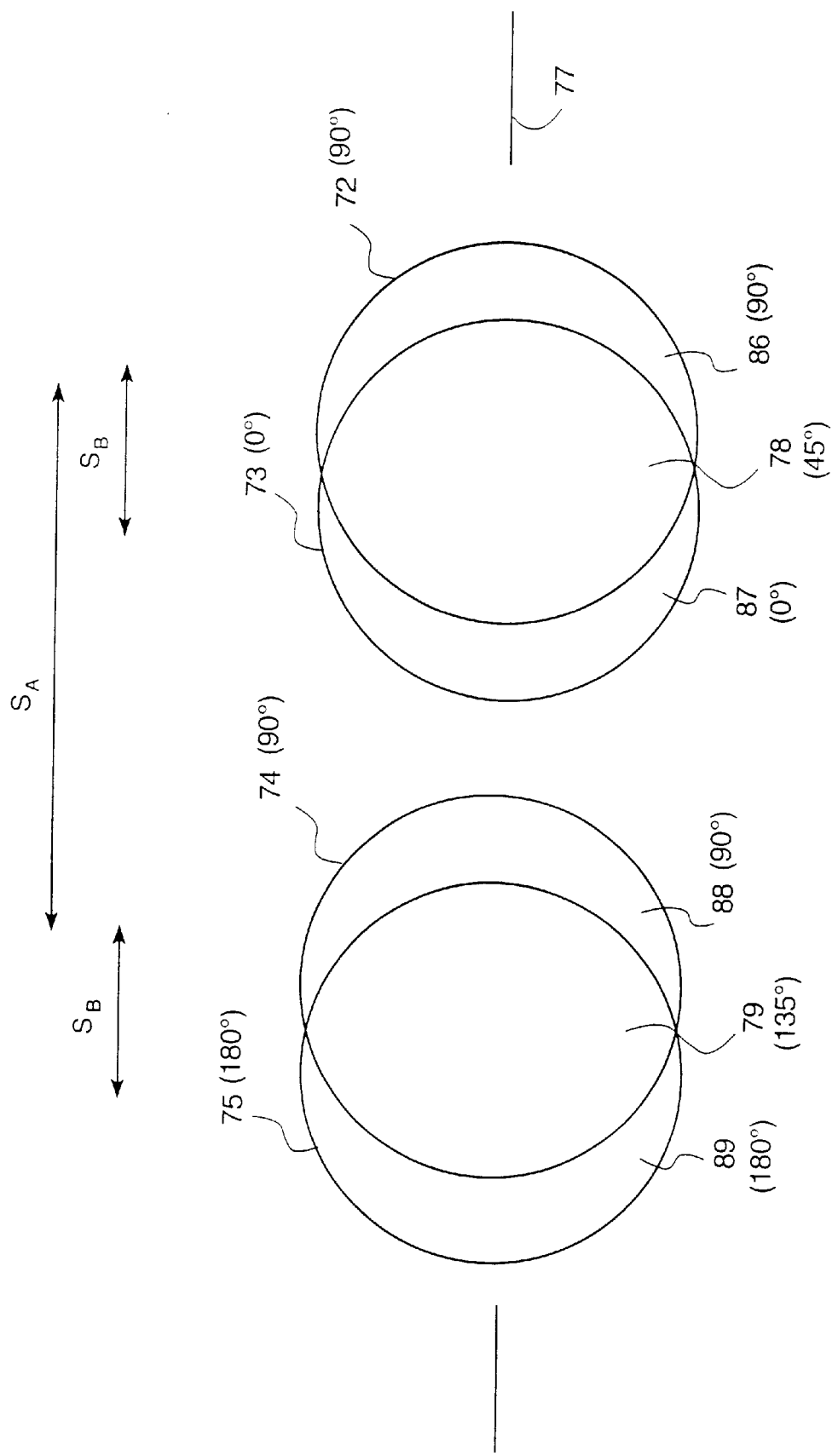

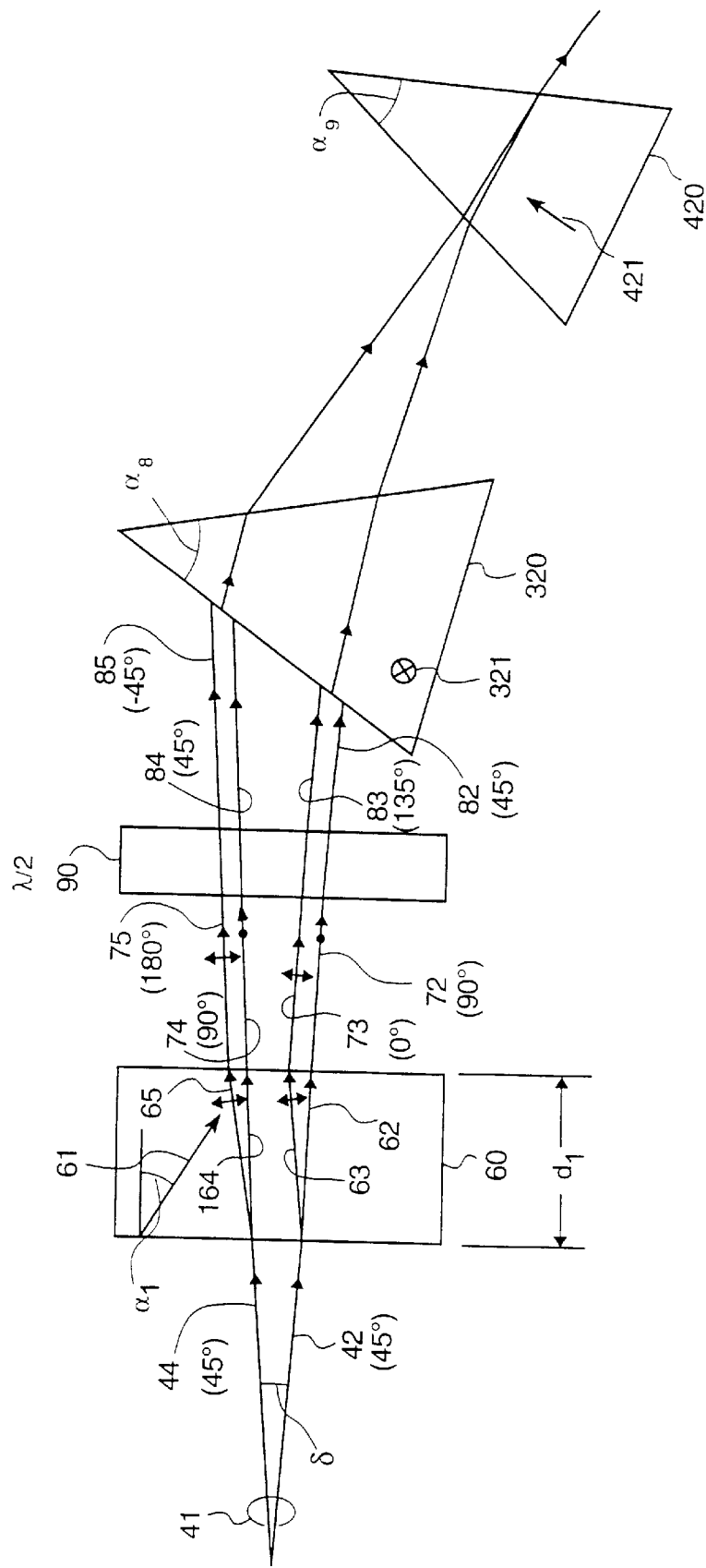

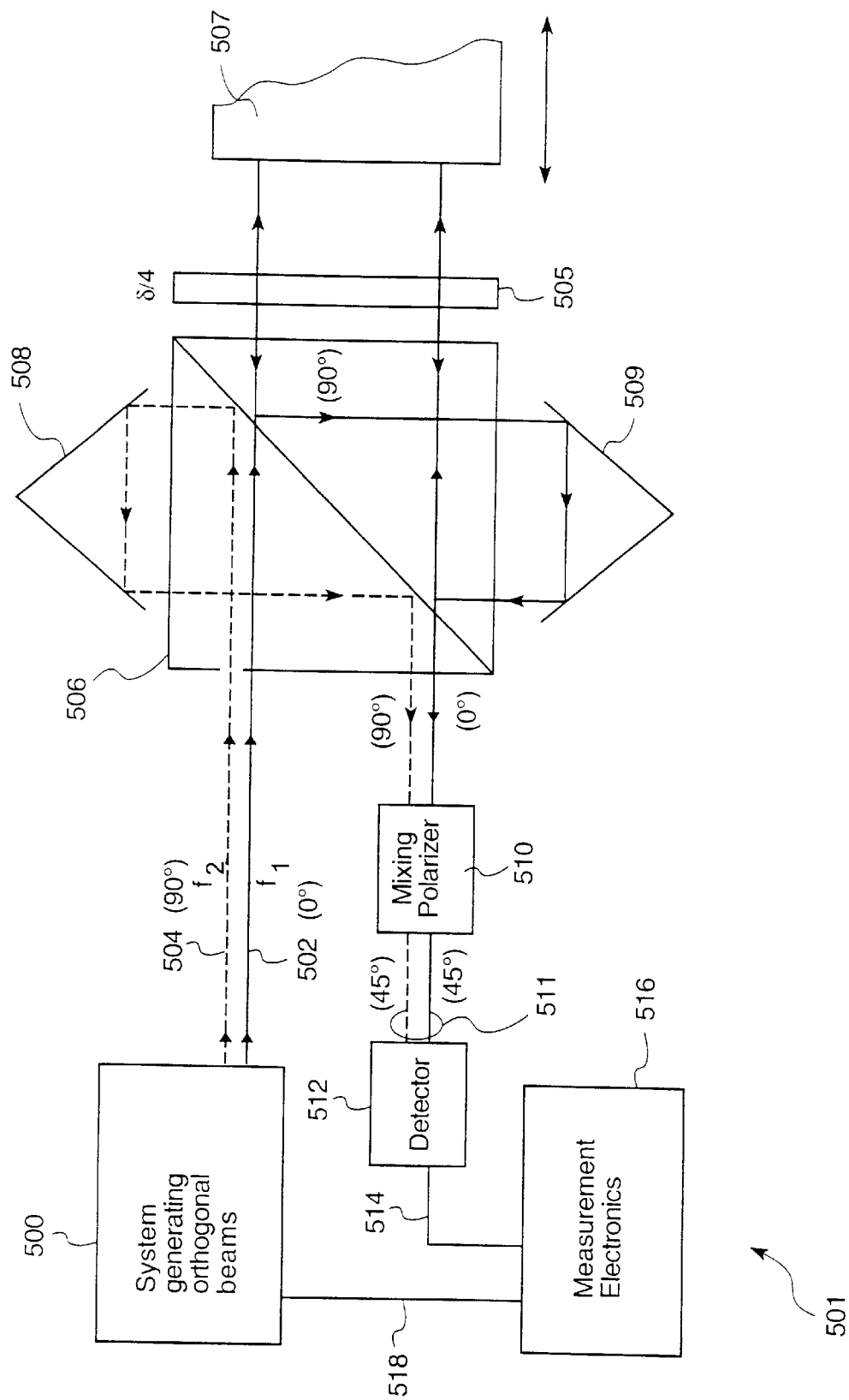

APPARATUS TO TRANSFORM TWO NONPARALLEL PROPAGATING OPTICAL BEAM COMPONENTS INTO TWO ORTHOGONALLY POLARIZED BEAM

This application is a continuation application of U.S. Ser. No. 09/061,928, filed Apr. 17, 1998, now U.S. Pat. No. 6,236,507.

BACKGROUND OF THE INVENTION

The invention relates to electro-optical systems used to perform extremely accurate measurement of changes in either length or optical path length, e.g., interferometry systems. More particularly, the invention relates to an apparatus for use with an interferometry system in which the apparatus transforms a single frequency, linearly polarized Laser beam into a beam with two frequency components that are orthogonally polarized.

The use of optical interferometry to measure changes in either length, distance, or optical path length has grown significantly due not only to technological advances in lasers, photosensors, and microelectronics but also to an ever increasing demand for high precision, high accuracy measurements [cf. N. Bobroff, "Recent advances in displacement measuring interferometry," *Meas. Sci. Technol.*, 4(9), 907–926 (1993)]. The prior art interferometers can be generally categorized into two types based on the signal processing technique used, i.e., either homodyne or heterodyne. The interferometers based on the heterodyne technique are generally preferred because (1) they are insensitive to low frequency drift and noise and (2) they can more readily have their resolution extended. Within the heterodyne type of interferometers, of particular interest are the ones based on the use of two optical frequencies.

In the prior art two-optical frequency heterodyne interferometers, the two optical frequencies are produced by one of the following techniques: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (August 1968); Bagley et al., U.S. Pat. No. 3,656,853, issued Apr. 18, 1972; and H. Matsumoto, "Recent interferometric measurements using stabilized lasers," *Precision Engineering*, 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," *Applied Optics*, 18(2), 219–224 (1979); N. Massie et al., "Measuring Laser Flow Fields With a 64-Channel Heterodyne Interferometer," *Applied Optics*, 22(14), 2141–2151 (1983); Y. Ohtsuka and M. Tsubokawa, "Dynamic Two-frequency Interferometry for Small Displacement Measurements," *Optics and Laser Technology*, 16, 25–29 (1984); H. Matsumoto, ibid.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt. Eng.*, 35 (4), 920–925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., ibid.; or (4) use of two longitudinal modes of a randomly polarized HeNe laser, see for example, J. B. Ferguson and R. H. Morris, "Single Mode Collapse in 6328 Å HeNe Lasers," *Applied Optics*, 17(18), 2924–2929 (1978).

As for the prior art use of a Zeeman split laser to produce the two optical frequencies, this approach is only applicable to certain lasers (e.g., HeNe) and limits the frequency difference between the two optical frequencies to about 2 MHz. This imposes a limit on the maximum rate of change of the length or optical length being measured. In addition, the available power from a Zeeman split laser is less than 500 microwatts, which can be a serious limitation when one laser source must be used for the measurement of multiple axes, such as three to six axes.

The acousto-optical modulator with a single acousto-optical Bragg cell of Sommargren, commonly owned U.S. Pat. No. 4,684,828 and of Dirksen, et al., ibid., and the acousto-optical modulator with two acousto-optical Bragg cells of Dirksen, et al., ibid., are based on normal Bragg diffraction in both non birefringent and birefringent Bragg cells. The normal Bragg diffraction generates a diffracted beam wherein the state of linear polarization of the diffracted beam is the same state of linear polarization as the incident, undiffracted beam. However, the objectives of the heterodyne interferometry are usually best served when the two optical beam components from an acousto-optical modulator are frequency shifted one with respect to the other, orthogonally polarized, and collinear. The process of converting the output beam components generated by a normal Bragg diffraction acousto-optical modulator, i.e., two non collinear beams in the same linear polarization state into two collinear beams in orthogonally polarized beams, has had an efficiency significantly less than 100%.

Accompanying the increasing demand for improved hiqh precision, high accuracy distance measurements is a demand to increase the number of axes being measured with distance measuring interferometry. The demand to increase the number of axes being measured translates to either increasing the number of laser source-acousto-optical modulator units, increasing the power of the laser source, and/or increasing the conversion efficiency with respect to power of the two frequency heterodyne source. An increase in the conversion efficiency is clearly an attractive option from a commercial point of view.

SUMMARY OF INVENTION

The present invention relates to an apparatus for providing light beams of orthogonal states of polarization and of different frequency for use in precision metrology applications such as in the measurement of length or length changes using interferometric techniques. The light beams of orthogonal states of polarization are typically parallel but may beneficially have a predetermined angle of divergence or convergence between them. Different embodiments of the invention are disclosed in the form of optical devices for efficiently converting an input optical beam comprising two components having differing frequency profiles, the same states of linear polarization, and directions of propagation differing by a small predetermined angle from a light source, typically comprising a single frequency laser and acousto-optical modulator, to an output beam having two principal, typically parallel, output beams of differing orthogonal states of polarization, one principal output beam comprising substantially the same frequency components as one of the input beam components and another principal output beam comprising substantially the same frequency components as another of the input beam components. The frequency profiles of the input beam components are typically different but may beneficially have the same frequency profiles for some applications. The energy flux profiles of the principal output beams may be spatially separated, partially coextensive, or substantially coextensive in accordance with the details of particular device embodiments. The input beam is introduced to a series of at least one phase retardation plate where it experiences phase retardations via optical birefringence of the at least one phase retardation plate to form two sets of orthogonally polarized internal beam components diverging by a small angle. The two sets of orthogonally polarized internal beam components subsequently become four external beams two of which, the principal ones, are available outside of the at least one phase retardation plate for use in anticipated downstream applications. The remaining two of the four output beams are typically reduced to nominally zero intensities compared to the intensity of the input beam so as to achieve a high efficiency conversion of the input beam into the principal output beams, thus rendering the two output beams with reduced intensities spurious. Spatial filtering may be used to further control any negative impact of the spurious beams.

Depending on the specific embodiment, progenitor beam components of selected ones of the external beams are either intercepted within or outside the series of at least one phase retardation plate so that the selected ones of the external beams are rendered typically parallel by a collimating means. The collimating means can be in the form of internal reflecting and/or integral refracting surfaces and/or external elements. However, if desired, the selected ones of the external beams can be non-parallel such that they have a predetermined angle of divergence or convergence between them.

The degree of overlap or spatial separation between the energy flux profiles of the principal, linearly-orthogonally polarized, external beams is controlled by various internal reflecting and refracting properties of the series of at least one phase retardation plate including the birefringence and optical properties of the material of the series of at least one phase retardation plate, the length of the physical path of travel experienced by the internal beam components, and/or the use of external control elements.

Thermal compensation can be provided via the use of thermal compensating birefringent elements or the arrangement of external components with respect to the series of at least one phase retardation plate or some combination of both. The surfaces of the series of at least one phase retardation plate, thermal compensating birefringent elements, the external elements, and the external control elements may be anti-reflection coated where appropriate to improve efficiency.

In general, in one aspect, the invention features an optical system including: a source which during operation generates two nonparallel propagating source beams; and a retarder element positioned to receive the two nonparallel propagating source beams and convert them into two nonparallel propagating output beams that are polarized substantially orthogonal to one another.

The optical system may include any of the following features. The nonparallel propagating source beams are diverging. The nonparallel propagating source beams are converging. The nonparallel propagating output beams are diverging. The nonparallel propagating output beams are converging. The retarder element is a retardation plate having substantially parallel entry and exit faces. The system further includes an additional retarder element positioned along a path defined by the source and output beams. The additional retarder element is positioned to receive the output beams and change their polarizations. The additional retarder is a half waveplate. The additional retarder is a quarter waveplate. The additional retarder element compensates for temperature dependent changes in the birefringence of the first mentioned retarder element. The additional retarder element is separate from the first mentioned retarder element. The additional retarder element is positioned to receive the nonparallel propagating output beams and generate nonparallel propagating output beams that exit from the additional retarder. The system further includes a third retarder element positioned to receive the nonparallel propagating output beams and generate substantially coextensive and collinear output beams that exit from the third retarder. The third retarder element is a birefringent prism. An optical axis of the retarder element lies substantially in a plane defined by the source beams. The retarder element is uniaxial. The optical frequencies of the two nonparallel propagating source beams differ from one another. The source includes: a laser generating a single-frequency, polarized beam; and a Bragg cell positioned to receive a beam derived from the polarized beam and generate the two nonparallel propagating source beams having optical frequencies that differ from one another. The source further includes: a source retarder element positioned to receive the beam derived from the polarized beam and transform it into ordinarily-polarized and extraordinarily-polarized beams, wherein immediately before exiting the source retarder element, the ordinarily-polarized and extraordinarily polarized beams generate a composite beam formed by a pair of overlapping beams, and wherein the Bragg cell is positioned to receive the composite beam and generate the two nonparallel propagating source beams having frequencies that differ from one another. The source further includes: a beam expander positioned to receive the bea derived from the polarized beam and expand the size of the polarized beam, and wherein the Bragg cell is positioned to receive the expanded beam and generate the two nonparallel propagating source beams having frequencies that differ from one another. The beam derived from the polarized beam is the polarized beam. The system further includes a beam contractor positioned to receive the nonparallel propagating output beams and contract the size of the nonparallel propagating output beams. The system is part of a distance measuring interferometry system, which also includes: an interferometer that directs at least a portion of one of the output beams along a reference optical path and at least a portion of the other of the output beams along a variable optical path and thereafter combines the portions of the output beams into a signal beam; and a detector for measuring an intensity of the signal beam. The detector includes a polarizer for producing a polarized signal beam having a polarization different from the polarizations of the output beams and the intensity of the signal beam measured by the detector is an intensity of the polarized signal beam. The interferometry system further includes measurement electronics for determining changes in the variable optical path from the measured intensity.

In general, in another aspect, the invention features a system including: a source which during operation generates first and second source beams propagating along nonparallel directions; and a retarder element positioned to receive the first and second source beams and to transform each of the first and second source beams into an ordinarily-polarized beam and an extraordinarily-polarized beam, wherein immediately before exiting the retarder element, the ordinarily-polarized and extraordinarily-polarized beams generated from the first source beam differ in optical phase by a first amount and the ordinarily-polarized and extraordinarily-polarized beams generated from the second source beam differ in optical phase by a second amount and wherein the first and second amounts differ by a value that is substantially equal to $\pi$ radians (modulo $2\pi$).

The system may include any of the following features. The first amount is substantially equal to π radians (modulo π). The first amount is substantially equal to π/2 radians (modulo π).

In general, in another aspect, the invention features a system including: a source which during operation generates first and second source beams propagating along nonparallel directions; and a retarder element positioned to receive the first and second source beams and transform each of the first and second source beams into overlapping ordinarily-polarized and extraordinarily-polarized beams, wherein upon exiting the retarder element the overlapping portions of the ordinarily-polarized and extraordinarily-polarized beams produced from the first source beam form a first output beam and the overlapping portions of the ordinarily-polarized and polarized beams produced from the second source beam form a second output beam and wherein the first and second output beams are polarized substantially orthogonal to one another.

The system may include any of the following features. An optical axis of the retarder element lies substantially in a plane defined by the first and second source beams. The optical axis makes an angle of about 45° with an axis collinear with the first source beam.

In general, in another aspect, the invention features a system including: a retarder element positioned to receive two nonparallel propagating input beams and convert them into two nonparallel propagating output beams that are polarized substantially orthogonal to one another; and a birefringent prism positioned to receive the two nonparallel propagating output beams from the retarder element and convert them into two substantially parallel optical beams that are polarized substantially orthogonal to one another.

The system may include any of the following features. The retarder element and the birefringent prism are integral with one another. One of the two nonparallel propagating output beams propagates within the birefringent prism as an ordinarily polarized beam and the other of the two nonparallel propagating output beams propagates within the birefringent prism as an extraordinarily polarized beam. The birefringent prism is made from a material in the group consisting of $LiNbO_3$, KDP, quartz, and $TeO_2$. The retarder element is made from a material in the group consisting of $LiNbO_3$, KDP, quartz, and $TeO_2$. The birefringent prism is a Wollaston prism. The system further includes a waveplate positioned between the retarder element and the birefringent prism.

In general, in another aspect, the invention features a system including: a source which during operation generates first and second source beams propagating along nonparallel directions; a retarder element positioned to receive the first and second source beams and produce first and second intermediate beams; and a birefringent prism positioned to receive the first and second intermediate beams and transform each of the first and second intermediate beams into ordinarily-polarized and extraordinarily-polarized beams, wherein the prism has a shape and a birefringence that causes the ordinarily-polarized beam produced from the first intermediate beam to produce a first output beam and the extraordinarily-polarized beam produced from the second intermediate beam to produce a second output beam, wherein the first and second output beams exit the prism substantially parallel to one another and wherein the combined energy of the first and second output beams is greater than half of the combined energy of the two source beams. In some embodiments, the polarizations of the first and second source beams are substantially the same.

In general, in another aspect, the invention features a system including: a source which during operation generates two nonparallel propagating source beams that are polarized substantially parallel to one another; a retarder plate positioned to receive the two nonparallel propagating source beams and produce two nonnparallel propagating intermediate beams, wherein the retarder plate has a thickness, birefringence, and orientation that causes the two nonparallel propagating intermediate beams to be polarized substantially orthogonal to one another upon exiting the retarder plate; and a birefringent prism positioned to receive the two nonparallel propagating intermediate beams and produce two output beams that are polarized substantially orthogonal to one another, wherein the prism has a shape and a birefringence that causes the two output beams to be substantially parallel to one another.

The system may have any of the following features. The system further includes a half waveplate positioned between the retarder plate and the birefringent prism to change the polarizations of the two nonparallel propagating intermediate beams. An optical axis of the retarder plate is substantially orthogonal to an optical axis of the birefringent prism.

In general, in another aspect, the invention features a method including the steps of: generating first and second beams which propagate along nonparallel directions; separating each of the first and second beams into overlapping ordinarily-polarized and extraordinarily-polarized beams; retarding the extraordinarily-polarized and ordinarily-polarized beams produced from the first beam relative to one another, wherein the overlapping portions of the extraordinarily-polarized and ordinarily-polarized beams produced from the first beam form a first output beam; and retarding the extraordinarily-polarized and ordinarily-polarized beams produced from the second beam relative to one another, wherein the overlapping portions of the extraordinarily-polarized and ordinarily-polarized beams produced from the second beam form a second output beam, and wherein the first and second output beams are polarized substantially orthogonal to one another.

The method may include any of the following features. The method further includes the step of making the first and second output beams propagate parallel to one another. The method further includes the step of making the first and second output beams substantially coextensive with one another. The first and second output beams have optical frequencies that differ from one another.

The invention has many advantages. It provides systems and methods for efficiently generating two substantially coextensive and collinear beams having orthogonal polarizations. In particular, the present invention has a conversion efficiency of nominally 100% for conversion of input intensity into intensities of two orthogonally polarized exit beam components, and in certain end use applications the intensity of each of two orthogonally polarized exit beam components may be adjusted to nominally 50% of the input intensity.

The system is also compact and requires relatively few optics. Additional optics can be included to optimize the overlap of the orthogonally polarized beams and to compensate for temperature-dependent changes in the birefringence of the retarder elements.

Furthermore, in other embodiments, the invention provides an apparatus for generating orthogonally polarized beams of different frequency with a predetermined angle of divergence between them and a predetermined lateral separation between their energy flux profiles.

Also, the invention can provide the source beams for a heterodyne detection distance measuring interferometry system. Such systems can provide the precise position and orientation of objects being processed, such as in semiconductor wafer processing. Moreover, because of the efficient generation provided by the invention, a single laser source in the interferometry system can drive interferometric distance measurements over a large number of measurement axes. In some embodiments, the invention also uses an acousto-optic modulator to generate a relatively large frequency difference (e.g., about 20 MHz) in the orthogonally polarized beam. This large bandwidth enables relatively fast scan speeds in the distance measuring apparatus.

Other features and advantages of the invention will be apparent from the following detailed description, and from the claims.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein:

FIGS. 1a–1h depict in schematic form the first embodiment and variants thereof of the present invention from the first category of embodiments and variants with FIG. 1a depicting in schematic form the first embodiment;

FIG. 1b depicts in schematic form the first variant of the first embodiment of the present invention;

FIG. 1c depicts in schematic form the second variant of the first embodiment of the present invention;

FIG. 1d depicts in schematic form the third variant of the first embodiment of the present invention;

FIG. 1e depicts in schematic form the fourth variant of the first embodiment of the present invention;

FIG. 1f depicts in schematic form the fifth variant of the first embodiment of the present invention;

FIG. 1g depicts in schematic form and in greater detail the embodiment shown FIG. 1a;

FIG. 1h depicts a cross-sectional view of beams entering a birefringent prism;

FIGS. 2a–2c depict in schematic form the second embodiment and variants thereof of the present invention from the second category of embodiments and variants with FIG. 2a depicting in schematic form the second embodiment;

FIG. 2b depicts in schematic form the first variant of the second embodiment of the present invention;

FIG. 2c depicts in schematic form the second variant of the second embodiment of the present invention;

FIG. 3b depicts in schematic form the first variant of the third embodiment of the present invention;

FIG. 6 depicts in schematic form a distance measuring interferometry system.

DETAILED DESCRIPTION OF THE PREFERRED EMBODIMENTS

The present invention relates to apparatus for providing light beams of orthogonal states of polarization and of different frequency for use in precision metrology applications such as in the measurement of length or length changes using interferometric techniques. A number of different embodiments of the invention are disclosed in the form of optical devices for efficiently transforming an input optical beam comprising two components having differing frequency profiles, the same states of linear polarization, and directions of propagation differing by a small predetermined angle from a light source to an output beam having two principal, typically parallel, output beams of differing states of polarization, one principal output beam comprising substantially the same frequency components as one of the input beam components and a second principal output beam comprising substantially the same frequency components as one other of the input beam components. The frequency profiles of the input beam components are typically displaced one from the other but may beneficially have the same frequency profiles. The energy flux profiles of the principal output beams may be spatially separated, partially coextensive, or substantially coextensive in accordance with the details of particular device embodiments and the requirements of the metrology or other contemplated application. In addition, thermal compensation may be made available through the use of thermal compensating elements.

Figure 1A:
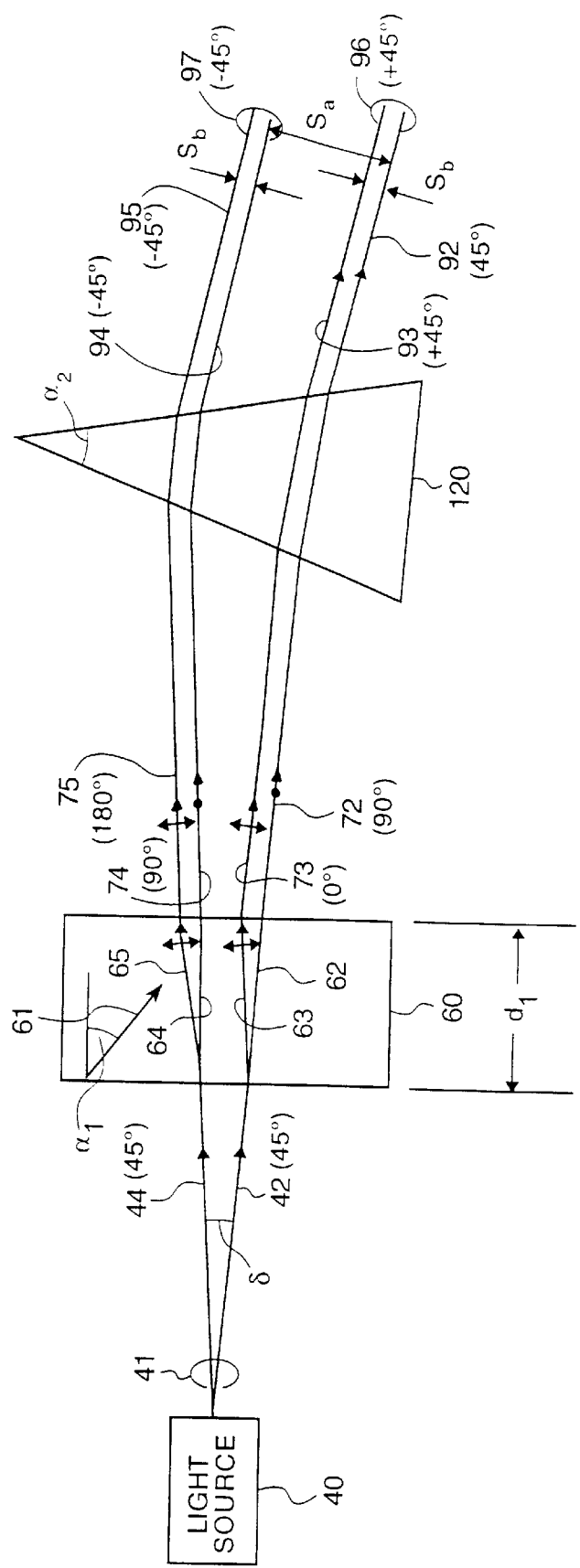

Referring to the drawings in detail, and initially to FIG. 1a, FIG. 1a depicts, in diagrammatic form, the first embodiment of the present invention. The primary optical element in the first embodiment is a phase retardation plate 60, shown in FIG. 1a, typically made of a birefringent crystal, e.g. $LiNbO_3$, potassium dihydrogen phosphate (KDP), or paratellurite ($TeO_2$), or another birefringent material, e.g. liquid crystals. The input beam 41, incident on a phase retardation plate 60, comprises two components, 42 and 44, with the two components having substantially the same but different frequencies, the same state of linear polarization, and directions of propagation differing by a small angle $\delta$, as shown in FIG. 1a, from a light source 40, comprising, for example, a single frequency laser and an acoustc-optical modulator. The directions of polarizations of beams 42 and 44 are substantially at 45° to the plane of FIG. 1a, the direction of the polarization of a beam relative to the plane of FIG. 1a being indicated in FIG. 1a as the angle in parentheses located next to the light beam number. For a given light beam, the angle is positive for a right-handed rotation from the x axis about a z axis, the x axis being contained in the plane of FIG. 1a, the y axis pointing out of the plane of FIG. 1a, and the z axis pointing in the direction of propagation of the given light beam. The optical axis 61 of the phase retardation plate 60 is orientated at an angle $\alpha$ with respect to a normal to the entrance facet of phase retardation plate 60 as illustrated in FIG. 1a and orthogonal to a normal to the plane of FIG. 1a.

Upon entering crystal 60, component 42 becomes first and second components 62 and 63, respectively, of an internal beam, wherein internal beam components 62 and 63 are ordinarily (90°) and extraordinarily (0°) polarized, respectively. Similarly, the second component 44 of the input beam becomes on entering phase retardation plate 60 third and fourth components 64 and 65, respectively, of the internal beam, wherein internal beam components 64 and 65 are ordinarily (90°) and extraordinarily (0°) polarized, respectively.

Since beam components 42 and 44 are incident on retardation plate 60 at different angles relative to optic axis 61, extraordinarily polarized beam components 63 and 65 propagate within retardation plate 60 with phase velocities corresponding to different indices of refraction.

In general, the index of refraction 11 for an extraordinarily polarized beam propagating at an angle θ with respect to an optical axis of a birefringent crystal is $$\frac{1}{n^2} = \frac{\cos^2\theta}{n_o^2} + \frac{\sin^2\theta}{n_e^2} \quad (1)$$

where $n_o$ and $n_e$ are the ordinary and extraordinary principal indices of refraction of the birefringent crystal. The different indices of refraction for beam components 63 and 65 can be determined from Eq. 1. The index of refraction for ordinarily polarized beam components 62 and 64 is $n_0$. According to these indices of refraction, the optic axis orientation (angle $\alpha_1$) and the thickness $d_1$ of retardation plate 60 are chosen such that retardation plate 60 introduces a phase shift of pπ radians in beam 63 relative to beam 62 and a phase shift of (p+1)π radians in beam 65 relative to beam 64, p being an integer. Typically the angle $\alpha_1$ is set at a value substantially equal to 45°.

For example, for a divergence of about 3.5 mrad between beam components 42 and 44, each having visible wavelengths and being incident substantially normal to a $LiNbO_3$ retardation plate 60 having an optic axis orientation of $\alpha_1$=45°, a suitable thickness $d_1$ is about 2.4 mm, or odd multiples thereof. For a retardation plate made of a material more birefringent than $LiNbO_3$, such as $TeO_2$, a suitable thickness can be smaller. In the case of $TeO_3$ it would be about 1.4 mm.

Beams 62, 63, 64, and 65 exit phase retardation plate 60 as beams 72, 73, 74, and 75, respectively. As a consequence of the phase shifts introduced in beams 62, 63, 64, and 65, the polarization of portions of beams 72 and 73 that overlap one another is substantially at 45° to the plane of FIG. 1a and is substantially orthogonal to the polarization of portions of beams 74 and 75 that overlap one another, which is substantially 135° to the plane of FIG. 1a. The directions of propagation of beams 72 and 73 are parallel and the directions of propagation of beams 74 and 75 are parallel, the entrance and exiting faces of retardation plate 60 being substantially parallel.

There is a small lateral shear $S_b$ between beams 72 and 73 and between beams 74 and 75 as shown in FIG. 1a, the two lateral shears being substantially the same. The lateral shears are primarily a consequence of the difference in the direction of the respective energy flux vectors and the wave front vectors for extraordinarily polarized beams 63 and 65 in phase retardation plate 60. The lateral shears between beams 72 and 73 and between beams 74 and 75 depicted in FIG. 1a are exaggerated for the purpose of clearly illustrating the effects. Typically, the lateral shear $S_b$ is substantially smaller than the spot size of beam components 72, 73, 74, and 75, which is typically not smaller than about 1 mm. For example, if either of beam components 42 and 44 are incident on a 2.4 mm thick $LiNbO_3$ retardation plate 60 at approximately an angle of normal incidence and $\alpha_1$ is approximately 45°, the lateral shear $S_b$ between beam components 72 and 73, or 74 and 75 is approximately 90 microns. Thus beams 72 and 73 and beams 74 and 75 substantially overlap in most cases.

Referring again to FIG. 1a, beams 72, 73, 74, and 75 enter a birefringent prism 120 made of a negative uniaxial crystal, e.g. $LiNbO_3$, or KDP. The optical axis of birefringent prism 120 is orientated at an angle of 45° to the plane of FIG. 1a. Alternatively, for a birefringent prism 120 made of a positive uniaxial crystal, e.g. quartz or $TeO_2$, the optical axis of birefringent prism 120 is orientated at an angle of 135° to the plane of FIG. 1a.

Upon entering birefringent prism 120, each of beams 72, 73, 74, and 75 separate into an ordinarily polarized beams (polarized at about 135°) and an extraordinarily polarized beams (polarized at about 45°) Because beams 72 and 73 substantially overlap one another and because of the phase difference between these two beams introduced by retardation plate 60, the ordinarily polarized beams from beams 72 and 73 destructively interfere with one another, substantially canceling out each other. Thus, the ordinarily polarized beams from 72 and 73 are not shown in FIG. 1a. Conversely, the extraordinarily polarized beams from beams 72 and 73 constructively interfere with one another and emerge from prism 120 as beams 92 and 93, respectively, which substantially overlap and have polarizations of 45°. Similarly, the extraordinarily polarized beams from beams 74 and 75 destructively interfere with one another, substantially canceling out each other. Thus, the extraordinarily polarized beams from beams 74 and 75 are not shown in FIG. 1a. The ordinarily polarized beams from beams 74 and 75 constructively interfere with one another and emerge from prism 120 as beams 94 and 95, respectively, which substantially overlap and have polarizations of −45°.

The apex angle $\alpha_2$ of birefringent prism 120 is selected so that beams 92 and 93 exit birefringent prism 120 parallel to beams 94 and 95. This is possible because beams 92 and 93 emerge from beams propagating as extraordinarily polarized beams in prism 120 and beams 94 and 95 emerge from beams propagating as ordinarily polarized beams in prism 120. As a result, the system produces a pair of substantially equal-intensity output beams, beam 96 (formed from the superposition of beams 92 and 93) and beam 97 (formed from the superposition of beams 94 and 95), beams 42 and 44 being of substantially equal intensities, that propagate parallel to one another and have orthogonal polarizations (45° and −45°, respectively). There is a small non zero lateral shear between beams 92 and 94, $S_a$, which is exaggerated in FIG. 1a. Typically this shear is less than about 100 microns. Beams 92 and 93 have the same frequency profile as the first input beam component 42 and beams 94 and 95 have the same frequency profile as the second input beam component 44, which is different from that of beams 92 and 93 if, for example, beams 42 and 44 emerge from an acousto-optic modulator within light source 40.

In some cases, such as when the lateral shear $S_b$ is not negligible, the destructive interference between portions of beams 72 and 73 that propagate as ordinarily polarized beams within prism 120 is not complete. Similarly, the destructive interference between portions of beams 74 and 75 that propagate as extraordinarily polarized beams within prism 120 can also be incomplete. However, even in these cases, birefringent prism 120 insures that beam 96 (which emerges from extraordinarily-polarized beams) has a polarization orthogonal to the polarization of beam 97 (which emerges from ordinarily-polarized beams). As shown in FIG. 1g, portions of beams 72 and 73 that propagate as ordinarily polarized beams within prism 120 and do not completely cancel out because of destructive interference emerge as spurious beams 92a and 93a, which diverge away from beams 96 and 97. Similarly, portions of beams 74 and 75 that propagate as extraordinarily polarized beams within prism 120 and do not completely cancel out because of destructive interference emerge as spurious beams 94a and 95a, which also diverge away from beams 96 and 97. Because of the divergence, a spatial filter can be used to separate the spurious beams from output beams 96 and 97.

The retardation imparted by retardation plate 60 minimizes the energy in spurious beams 96a (the combination of beams 92*a* and 93*a*) and 97*a* (the combination of beams 94*a* and 95*a*) by the destructive interference of beams 92*a* and 93*a* and beams 94*a* and 95*a*, respectively. And, the retardation imparted by retardation plate 60 maximizes the energy in beams 96 (the combination of beams 92 and 93) and 97 (the combination of beams 94 and 95) by the constructive interference of beams 92 and 93 and beams 94 and 95, respectively. FIG. 1*h* shows a cross-section of beams 72, 73, 74, and 75 before entering birefringent prism 120 (intersecting reference plane 77 in FIG. 1*g*). For purposes of illustration, the beams have exaggerated lateral shears $S_a$ and $S_b$. The overlapping portions of beams 72 and 73 produce superposition beam 78 having a polarization of 45° and the non-overlapping portions, 86 and 87, retain the polarizations of beams 72 and 73, respectively. Similarly, the overlapping portions of beams 74 and 75 produce superposition beam 79 having a polarization of 135° and the non-overlapping portions, 88 and 89, retain the polarizations of beams 74 and 75, respectively. Superposition beams 78 and 79 contribute entirely to output beams 96 and 97, respectively, after passing through prism 120. In contrast, non-overlapping portions 86, 87, 88, 89 contribute equally to output beams 96 and 97 and spurious beams 92*a*, 93*a*, 94*a*, and 95*a* after passing through prism 120. Thus, for a retardation plate imparting the correct phase differences, the energy in the spurious beams decreases with lateral shear $S_b$.

In some cases, small amounts of the overlapping portions of beams 72 and 73, and beams 74 and 75, also contribute to the spurious beams if the respective retardations imparted by retardation plate 60 are not homogeneous across the respective beam profiles or differ from the correct amount (i.e., a phase shift of $p\pi$ radians in beam 63 relative to beam 62 where p is an integer and a phase shift of $(p+1)\pi$ radians in beam 65 relative to beam 64). However, even in such cases, birefringent prism 120 insures that output beams 96 and 97 have orthogonal polarizations. The efficiency of the transformation of input beam 41 into output beams 96 and 97 may be defined differently for different end use applications. One end use application may simply consider only the efficiency of transformation into an output beam without concern for degree of overlap or coextensiveness of output beam components whereas in another end use application, the degree of overlap or coextensiveness of output beam components is important such as in the creation of heterodyne interference signals. The efficiency of the transformation with respect to the creation of a heterodyne signal is dependent on a series of factors comprising the size of the lateral shear $S_b$, the size of lateral shear $S_a$, and the size of the small angle $\delta$ relative to the size of the beam divergence of the input beam components 42 and 44, the size of a beam divergence being related to the diameter of the beam.

The size of lateral shear $S_a$ effects the degree of overlap of the amplitudes of light beams with differing frequencies leading to the heterodyne signal. The size of a beam divergence relative to the size of the small angle $\delta$ effects the size of the variation in the $\pi$ phase shift introduced between the relative phase of beams 64 and 65 and the relative phase of beams 62 and 63 that can be achieved by the phase retardation plate 60. Expressions for the efficiency are obtained for the case where the amplitudes of beams 72, 73, 74, and 75 are constant across the respective wavefronts to illustrate in the simple form the properties of the invention without departing from the spirit and scope of the invention.

One expression for the efficiency $Eff(S_a, S_b)$ is $$Eff(S_a = 0, S_b) = \frac{1}{\pi}(\vartheta_{b1}\cos 2\phi + \vartheta_{b2}) - \frac{S_b}{2R}\frac{1}{\pi}\left(\sin\vartheta_{b1}\cos 2\phi + \frac{1}{2}\sin\vartheta_{b2}\right) \quad (2)$$

where $$\vartheta_{b1} = \cos^{-1}\left(\frac{S_b}{2R}\right) \quad (3)$$

$$\vartheta_{b2} = \cos^{-1}\left(\frac{S_b}{4R}\right) \quad (4)$$

$$\phi = \left(\frac{S_b}{2R}\right)\left(\frac{\lambda_0}{2R}\right)\frac{\pi}{\delta} \quad (5)$$

$$S_b = (r - \theta)d_1 \quad (6)$$

R is the radius of the output beam components, $\lambda_0$ is the wavelength of the light beam in vacuum, $d_1$ is the thickness of phase retardation plate 60 as shown in FIG. 1*a*, and r is the angle between the energy flux vector of a beam and the optical axis of phase retardation plate 60 and having the angle $\theta$ between the normal to the wave front of the beam and the optical axis of phase retardation plate 60.

A second expression for the efficiency $Eff(S_a, S_b)$ is $$Eff(S_a, S_b = 0) = \frac{2}{\pi}\left(\varphi_a - \frac{S_a}{2R}\sin\vartheta_a\right) \quad (7)$$

$$\vartheta_a = \cos^{-1}\left(\frac{S_a}{2R}\right) \quad (8)$$

The angle r is related to $\theta$ and the principal indices of refraction $n_o$ and $n_e$ of phase retardation plate 60 according to the formula $$\tan r = \frac{n_o^2}{n_e^2}\tan\theta \quad (9)$$

[cf. Section 7 of Chapter 10 by J. Bennett and H. Bennett, "*Handbook of Optics* (McGraw-Hill, N.Y.) 1978]. By mathematical manipulation of Eq. (9), the difference (r–θ) can be expressed as $$\tan(r - \theta) = \frac{(n_o^2 - n_e^2)\tan\theta}{n_e^2 + n_o^2\tan^2\theta} \quad (10)$$

By using these or related equations, tolerable upper limits for $S_a$ and $S_b$ can be determined.

A number of different embodiments of the apparatus of the invention in addition to the first embodiment (shown in FIG. 1*a*) are described. While they differ in some details, the disclosed embodiments otherwise share many common elements and the additional embodiments naturally fall into four categories, the first category comprising the first embodiment and variants thereof. The second category includes embodiments wherein the effects of the lateral shear $S_a$ on the efficiency of transformation are either reduced or substantially eliminated, the third category includes embodiments wherein the effects of the lateral shear $S_b$ on the efficiency of transformation are either reduced or substantially eliminated, and the fourth category includes embodiments wherein the efficiency of conversion and the relative phase of the principal output beam components relative to the relative phase of the different frequency components of the input beam are temperature compensated for changes in temperature of birefringent elements of an embodiment.

Figure 1B:
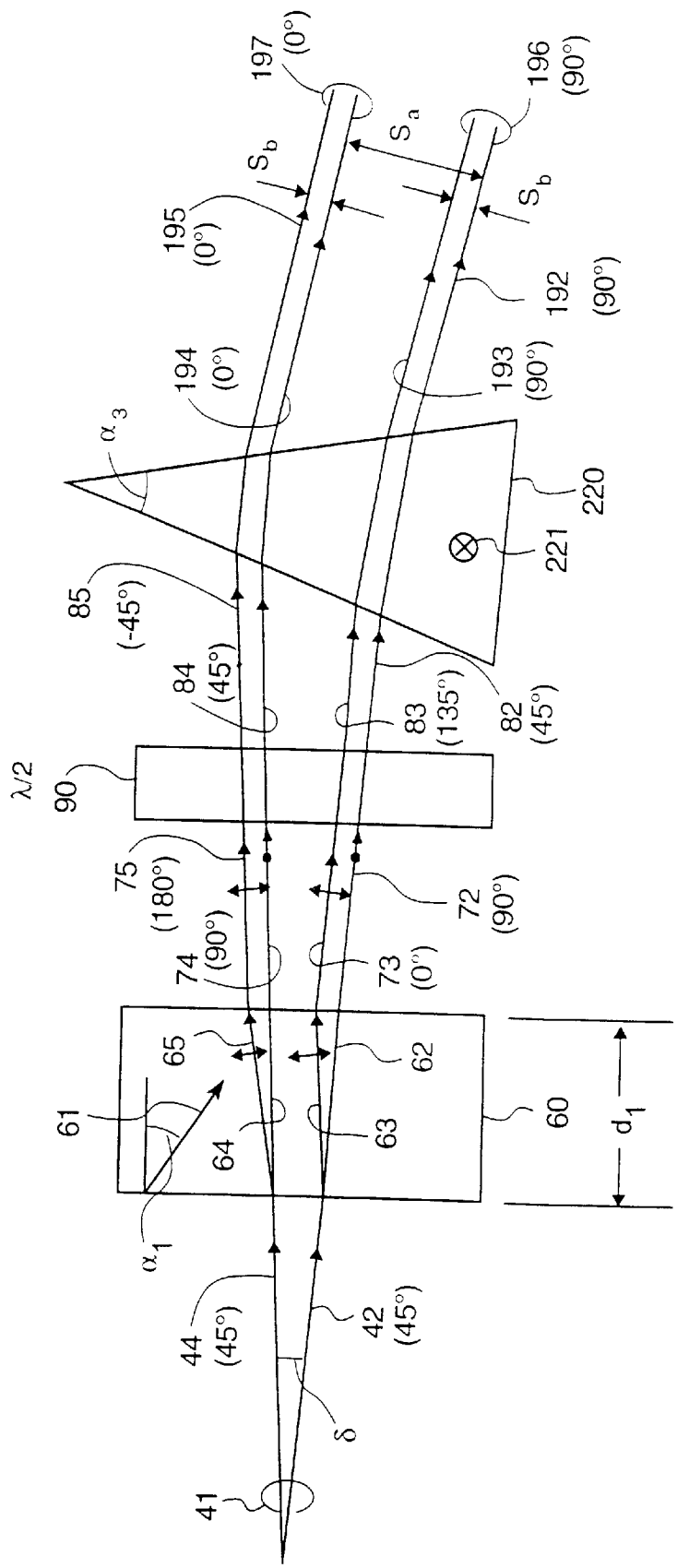

Reference is now made to FIG. 1b, which depicts in diagrammatic form the first variant of the first embodiment of the present invention. The first variant of the first embodiment is from the first category as described in the preceding paragraph. The apparatus of the first variant of the first embodiment in FIG. 1b comprises many of the same elements as the first embodiment in FIG. 1a, the elements of the first variant of the first embodiment performing like operations as like denoted elements in the first embodiment.

The description of light beam 41 for the first variant of the first embodiment is the same as that for the description of light beam 41 for the first embodiment. Further, the description of light beam components 72, 73, 74, and 75 and the progenitors of light beam components 72, 73, 74, and 75 for the first variant of the first embodiment is the same as that for the description of light beam components 72, 73, 74, and 75 and the progenitors of light beam components 72, 73, 74, and 75 for the first embodiment.

Referring to FIG. 1b, beams 72, 73, 74, and 75 enter half-wave phase retardation plate 90 of the usual type and exit 90 as beams 82, 83: 84, and 85, respectively. Phase retardation plate 90 rotates the planes of polarization of beams 72, 73, 74, and 75 such that the polarization of one of the combined beams is substantially polarized in the plane of FIG. 1a and the polarization of the other combined beam is substantially polarized perpendicular to the plane of FIG. 1b, the polarization of combined beams 82 and 83 being substantially orthogonal with respect to the polarization of combined beams 84 and 85.

Light beams 82, 83, 84, and 85 enter birefringent prism 220. Beams 192 and 193 emerge from extraordinarily polarized beams within prism 220 and combine to form output beam 196 and beams 194 and 195 emerge from ordinarily polarized beams within prism 220 and combine to form output beam 197. The optical axis of birefringent prism 220 is orientated at an angle of 90° to the plane of FIG. 1b and is made of a negative uniaxial crystal, e.g. LiNbO$_3$ or KDP. Alternatively, the optical axis of birefringent prism 220 is orientated at 0° to the plane of FIG. 1b and is made of a positive uniaxial crystal, e.g. quartz or TeO$_2$. The optical axis 221 of birefringent prism 220 is shown in FIG. 1b for a negative uniaxial crystal. The apex angle $\alpha_3$ of birefringent prism 220, shown in FIG. 1b, is selected so that beams 192, 193, 194, and 195 have parallel directions of propagation. Output beams 196 and 197 thus propagate parallel to one another, have orthogonal polarizations, and are substantially coextensive. There is a non-zero lateral shear between beams 192 and 194, $S_a$, which is exaggerated in FIG. 1b. Beams 192 and 193 have the same frequency profile as the first input beam component 42 and beams 194 and 195 have the same frequency profile as the second input beam component 44 which typically is displaced from that of beams 192 and 193.

The remaining description of the first variant of the first embodiment is the same as corresponding portions of the description given for the first embodiment, except that the polarizations of output beams 196 and 197 are at 90° and 0°, respectively. The difference in polarization is a consequence of the orientation of optic axis 221 in prism 220.

Figure 1C:
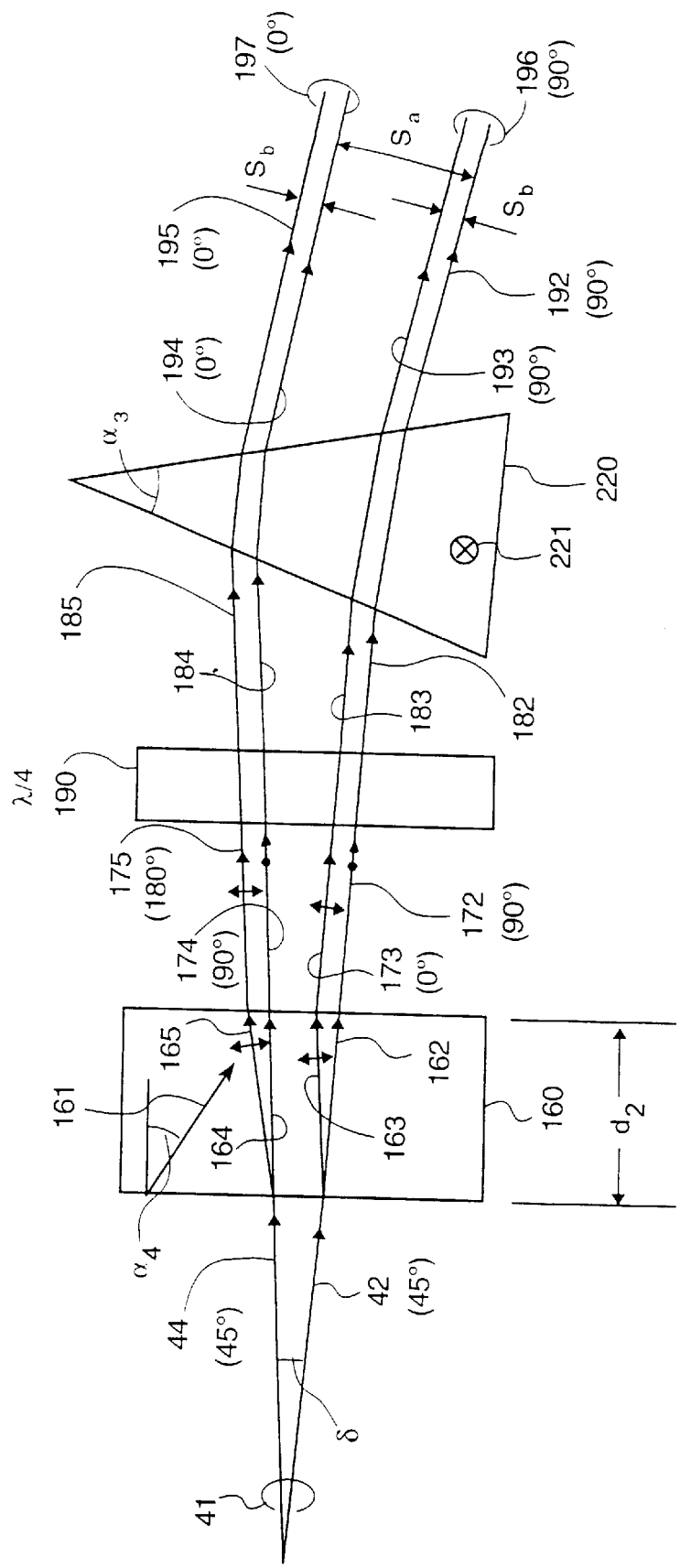

Reference is now made to FIG. 1c, which depicts in diagrammatic form the second variant of the first embodiment of the present invention. The second variant of the first embodiment is from the first category, the same category as that of the first embodiment. The apparatus of the second variant of the first embodiment in FIG. 1c comprises many of the same elements as the first variant of the first embodiment in FIG. 1b, the elements of the second variant of the first embodiment performing like operations as like denoted elements in the first variant of the first embodiment.

The description of light beam 41 for the second variant of the first embodiment is the same as that for the description of light beam 41 for the first embodiment. The primary optical element in the second variant of the first embodiment is a phase retardation plate 160 typically made of a birefringent crystal, e.g. LiNbO$_3$, KDP, or TeO$_2$, shown in FIG. 1c. The optical axis 161 of the phase retardation plate 160 is orientated at an angle $\alpha_4$ with respect to a normal to the entrance facet of phase retardation plate 160 as illustrated in FIG. 1c and orthogonal to a normal to the plane of FIG. 1c.

Upon entering crystal 160, component 42 becomes first and second components 162 and 163, respectively, of an internal beam, wherein internal beam components 162 and 163 are ordinarily (90°) and extraordinarily (0°) polarized, respectively. Similarly, the second component 44 of the input beam becomes on entering phase retardation plate 160 a third and fourth components 164 and 165, respectively, of the internal beam, wherein internal beam components 164 and 165 are ordinarily (90°) and extraordinarily (0°) polarized, respectively.

Phase retardation plate 160 introduces a phase shift of $[p+(\frac{1}{2})]\pi$ radians in beam 163 relative to beam 162 where p is an integer and a phase shift of $[p+(\frac{3}{2})]\pi$ radians in beam 165 relative to beam 164 by having the angle $\alpha_4$ set at a value between 0° and 90°, typically set at substantially 45°, and adjusting the thickness $d_2$ of phase retardation plate 160. Beams 162, 163, 164, and 165 exit phase retardation plate 160 as beams 172, 173, 174, and 175, respectively. As a consequence of the phase shifts introduced in beams 162, 163, 164, and 165, the polarization of combined beams 172 and 173 is either substantially right-hand or left-hand circularly polarized and the polarization of combined beams 174 and 175 is either substantially left-hand or right-hand circularly polarized. The directions of propagation of beams 172 and 173 are parallel and the directions of propagation of beams 174 and 175 are parallel, the entrance and exiting faces of crystal 160 being parallel.

Referring to FIG. 1c, beams 172, 173, 174, and 175 enter quarter-wave phase retardation plate 190 of the usual type and exit 190 as beams 182, 183, 184, and 185, respectively. Phase retardation plate 190 is orientated to convert a circularly polarized beam into a linearly polarized beam such that the superposition of beams 182 and 183 is substantially linearly polarized perpendicular to the plane of FIG. 1c and the superposition of beam 184 and 185 is substantially linearly polarized in the plane of FIG. 1c, the linear polarization of combined beams 182 and 183 thus being substantially orthogonal to the linear polarization of combined beams 184 and 185. The individual polarizations of beams 182, 183, 184, and 185 are circularly polarized and thus parenthetical indications of linear polarization for these beams are not present in FIG. 1c.

Light beams 182, 183, 184, and 185 enter birefringent prism 220 and exit as beams 192, 193, 194, and 195, respectively. The remaining description of the second variant of the first embodiment is the same as corresponding portions of the description given for the first variant of the first embodiment.

Figure 1D:
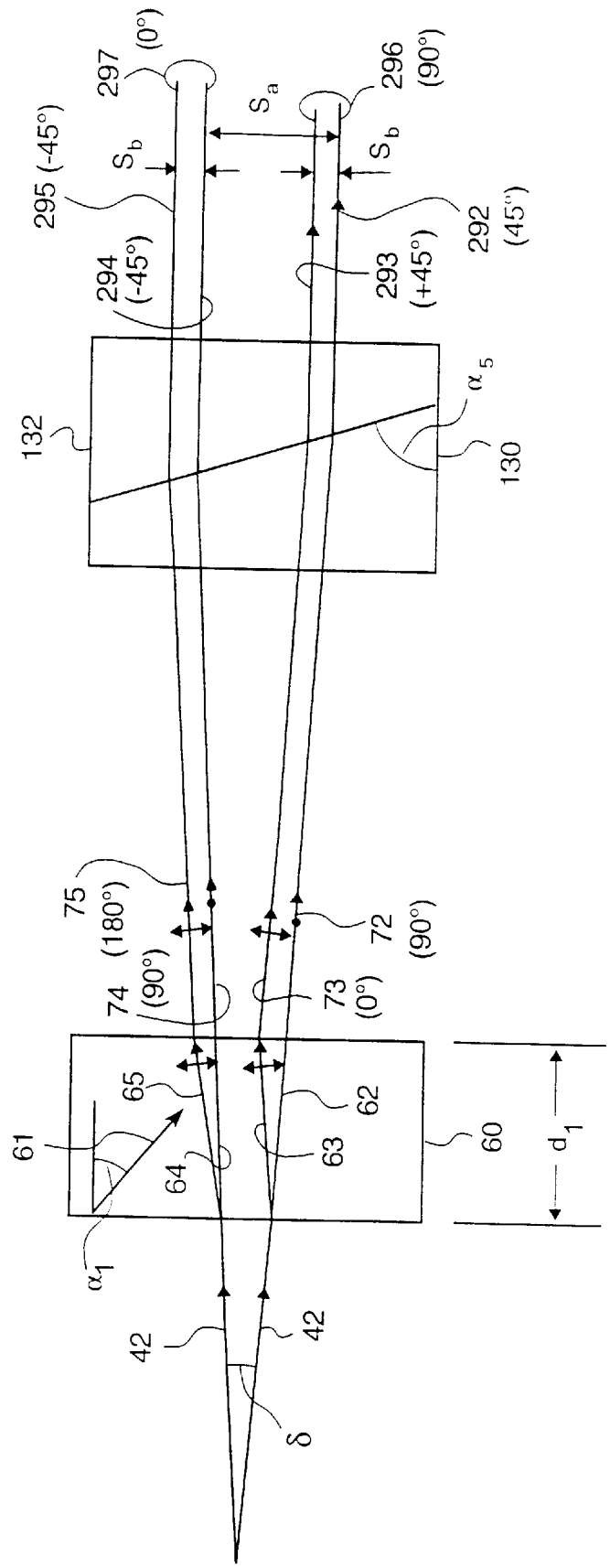

Reference is now made to FIG. 1d, which depicts in diagrammatic form the third variant of the first embodiment of the present invention. The third variant of the first embodiment is from the first category of embodiments, the same category as that of the first embodiment. The apparatus of the third variant of the first embodiment in FIG. 1d comprises many of the same elements as the first embodiment in FIG. 1a, the elements of the third variant of the first embodiment performing like operations as like denoted elements in the first embodiment.

The description of light beam 41 for the third variant of the first embodiment is the same as that for the description of light beam 41 for the first embodiment. A principal optical element in the third variant of the first embodiment is a phase retardation plate 60, the same as phase retardation plate 60 of the first embodiment.

The optical elements in the third variant of the first embodiment different from the elements of the first embodiment are birefringent prisms 130 and 132, the combination of the two birefringent prisms being, for example, of the Wollaston prism type. The two orthogonal optical axes of the two components of the Wollaston prism, 130 and 132, are orientated at angles ±45° to the plane of FIG. 1d. The angle $\alpha_5$ of the Wollaston prism comprising components 130 and 132 is chosen so that the output beams 292, 293, 294, and 295 have parallel directions of propagation. Beams 292 and 293 are from components of beams 72 and 73, respectively, in the same manner as beams 92 and 93 are from components of beams 72 and 73 as described in the first embodiment. Beams 294 and 295 are from components of 74 and 75, respectively, in the same manner as beams 94 and 95 are from components of beams 74 and 75 as described in the first embodiment. Beams 292 and 293 combine to form output beam 296 and beams 294 and 295 combine to form output beam 297.

The principal difference between the third variant of the first embodiment and the first embodiment is that the directions of propagation of the principal output beams of the third variant of the first embodiment are substantially parallel to the direction of propagation of the input beam, whereas the directions of propagation of the principal output beams of the first embodiment differ from the direction of propagation of the input beam by some non-zero angle.

The remaining description of the third variant of the first embodiment is the same as corresponding portions of descriptions given for the first embodiment.

Figure 1E:
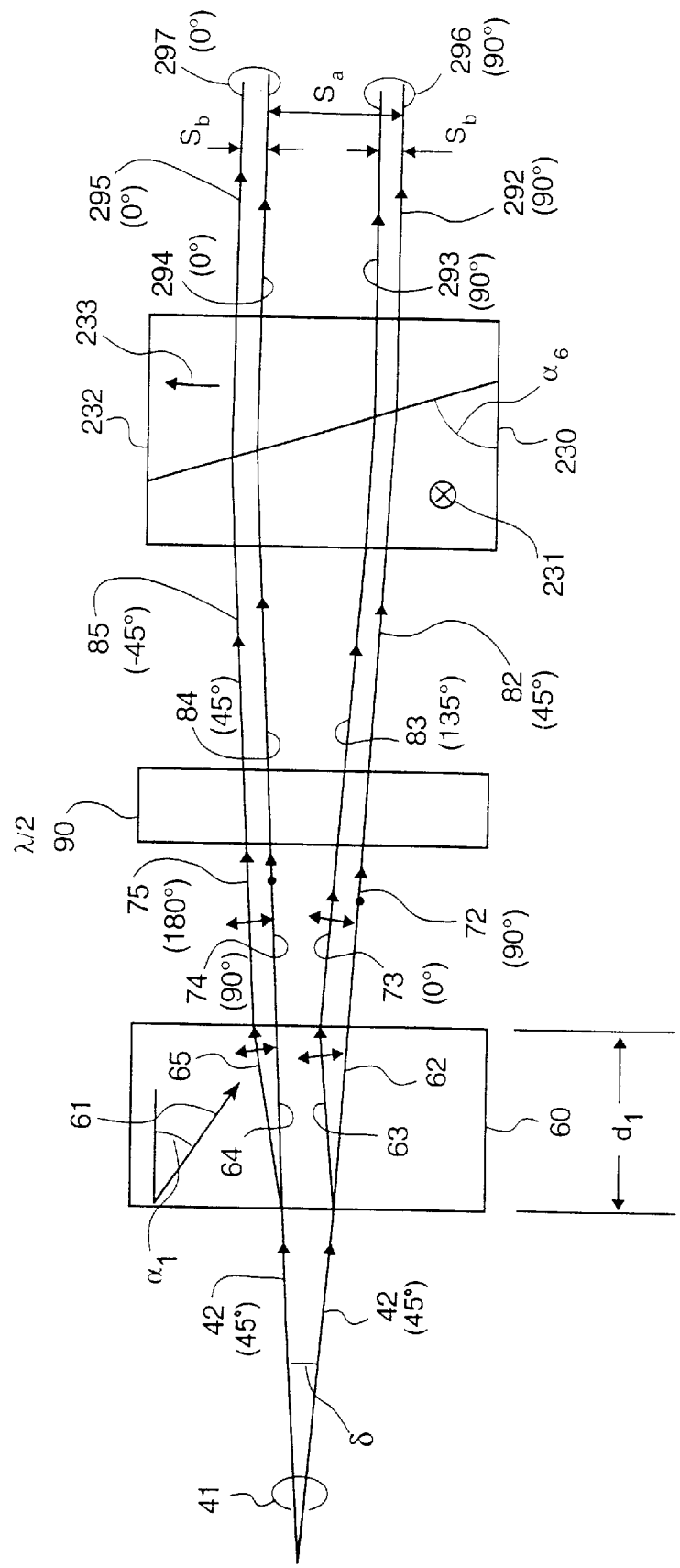

Reference is now made to FIG. 1e, which depicts in diagrammatic form the fourth variant of the first embodiment of the present invention. The fourth variant of the first embodiment is from the first category of embodiments, the same category as that of the first embodiment. The apparatus of the fourth variant of the first embodiment in FIG. 1e comprises many of the same elements as the first variant of the first embodiment in FIG. 1b, the elements of the fourth variant of the first embodiment performing like operations as like denoted elements in the first variant of the first embodiment.

The description of light beam 41 for the fourth variant of the first variant is the same as that for the description of light beam 41 for the first variant of the first embodiment. A principal optical element in the fourth variant of the first embodiment is a phase retardation plate 60, the same as phase retardation plate 60 of the first variant of the first embodiment.

The optical elements in the fourth variant of the first embodiment different from the elements of first variant of the first embodiment are birefringent prisms 230 and 232, the combination of the two prisms being, for example, of the standard Wollaston prism type. The two orthogonal optical axes 231 and 233 of the two birefringent components of the Wollaston prism, 230 and 232, respectively, are orientated parallel to and orthogonal to the plane of FIG. 1e or vice versa depending on the properties of the birefringent crystals comprising birefringent prisms 230 and 232. The optical axes 231 and 233 are shown in FIG. 1e for birefringent prisms 230 and 232 comprising negative uniaxial crystals. The angle $\alpha_6$ of the Wollaston prism comprising components 230 and 232 is chosen so that the output beams 292, 293, 294, and 295 have parallel directions of propagation. Beams 292 and 293 are from components of beams 82 and 83, respectively, in the same manner as beams 192 and 193 are from beams 82 and 83 as described in the first variant of the first embodiment. Beams 294 and 295 are from components of beams 84 and 85, respectively, in the same manner as beams 194 and 195 are from components of beams 84 and 85 as described in the first variant of the first embodiment.

The remaining description of the fourth variant of the first embodiment is the same as corresponding portions of descriptions given for the first variant of the first embodiment, except that the polarizations of output beams 296 and 297 are at 90° and 0°, respectively. The difference in polarization is a consequence of the orientation of optic axes 231 and 233 in prisms 230 and 232.

The principal difference between the fourth variant of the first embodiment and the first variant of the first embodiment is that the directions of propagation of the principal output beams of the fourth variant of the first embodiment are substantially parallel to the direction of propagation of the input beam, whereas the directions of propagation of the principal output beams of the first variant of the first embodiment differ from the direction of propagation of the input beam by some non-zero angle.

Figure 1F:
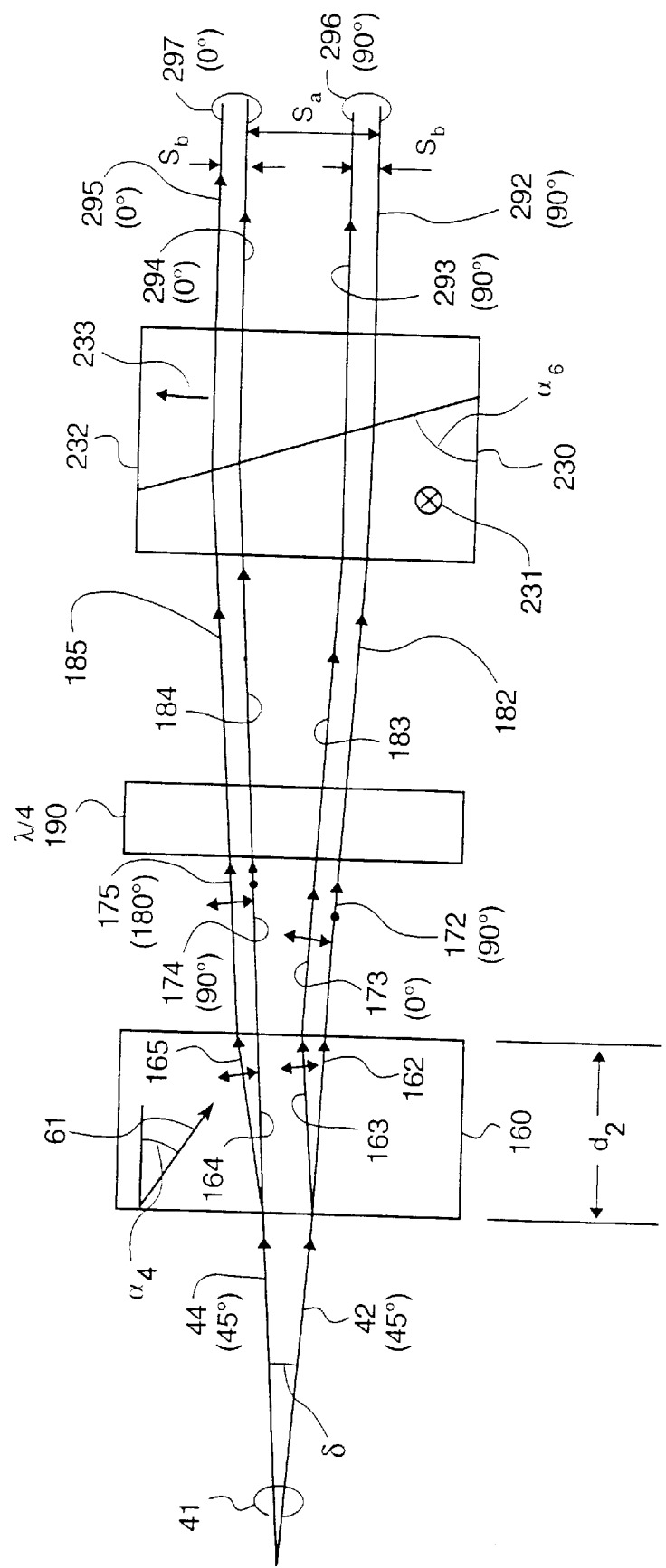

Reference is now made to FIG. 1f, which depicts in diagrammatic form the fifth variant of the first embodiment of the present invention. The fifth variant of the first embodiment is from the first category of embodiments, the same category as that of the first embodiment. The apparatus of the fifth variant of the first embodiment depicted in FIG. 1f comprises many of the same elements as the second variant of the first embodiment depicted in FIG. 1c, the elements of the fifth variant of the first embodiment performing like operations as like denoted elements in the second variant of the first embodiment.

The description of light beam 41 for the fifth variant of the first embodiment is the same as that for the description of light beam 41 for the second variant of the first embodiment. A principal optical element in the fifth variant of the first embodiment is a phase retardation plate 160, the same as phase retardation plate 160 of the second variant of the first embodiment.

The optical elements in the fifth variant of the first embodiment different from the elements of the second variant of the first embodiment are birefringent prisms 230 and 232, the combination of birefringent prisms 230 and 232 being, for example, of the standard Wollaston prism type. The two orthogonal optical axes 231 and 233 of the two birefringent components, 230 and 232, respectively, of the Wollaston prism are orientated parallel to and orthogonal to the plane of FIG. 1f. The optical axes 231 and 233 are shown in FIG. 1f for birefringent prisms 230 and 232 comprising negative uniaxial crystals. The angle $\alpha_6$ of Wollaston prism comprising components 230 and 232 is chosen so that the output beams 292, 293, 294, and 295 have parallel directions of propagation. Beams 292 and 293 are from components of beams 182 and 183, respectively, in the same manner as beams 192 and 193 are from beams 182 and 183 as described in the second variant of the first embodiment. Beams 294 and 295 are from components of beams 184 and 185, respectively, in the same manner as beams 194 and 195 are from components of beams 184 and 185 as described in the second variant of the first embodiment.

The remaining description of the fifth variant of the first embodiment is the same as corresponding portions of descriptions given for the second variant of the first embodiment.

The principal difference between the fifth variant of the first embodiment and the second variant of the first embodiment is that the directions of propagation or the principal output beams of the fifth variant of the first embodiment are substantially parallel to the direction of propagation of the input beam, whereas the directions of propagation of the principal output beams of the second variant of the first embodiment differ from the direction of propagation of the input beam by some non-zero range.

Figure 2A:
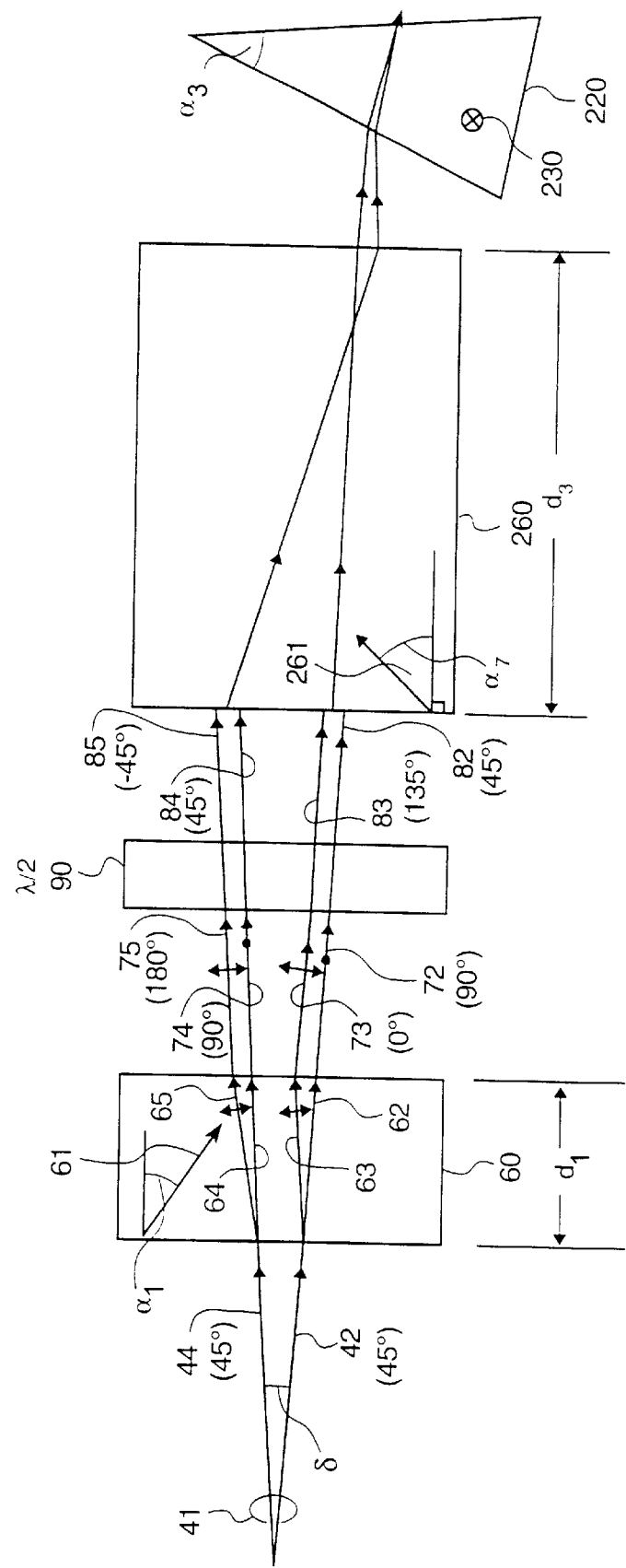

Reference is now made to FIG. 2a, which depicts in diagrammatic form the second embodiment of the present invention. The second embodiment is from the second category of embodiments wherein the effects of lateral shear of the type $S_a$ on the efficiency of transformation are either reduced or substantially eliminated. The apparatus of the second embodiment in FIG. 2a comprises many of the same elements as the first variant of the first embodiment in FIG. 1b, the elements of the second embodiment performing like operations as like denoted elements in the first variant of the first embodiment.

The description of light beam 41 for the second embodiment is the same as that for the description of light beam 41 for the first embodiment. A principal optical element in the second embodiment different from the elements of the first variant of the first embodiment is a phase retardation plate 260 shown in FIG. 2a, typically made of the same birefringent material as phase retardation plate 60. The optical axis 261 of the phase retardation plate 260 is orientated at an angle $\alpha_7$ with respect to a normal to the entrance facet of phase retardation plate 260 as illustrated in FIG. 2a that is orthogonal to a normal to the plane of FIG. 2a. The angle between optical axis 261 and optical axis 61 typically is nominally 90°. With the prescribed orientation of the optical axis 261, the lateral shear between the beam comprising the combination of beams 84 and 85 and the beam comprising the combination of beams 82 and 83 is reduced as the respective beams propagate through phase retardation plate 260. The reduction is a consequence of the lateral shear produced by the difference between the directions of the energy flux vector and the wave front vector for each of the extraordinarily polarized components of beams 84 and 85 in phase retardation plate 260. The thickness $d_3$ of phase retardation plate 260 is chosen so that the net lateral displacement $S_a$ after prism 220 between the principal output beams, i.e. beams 192 and 193 and beams 194 and 195 (as shown in FIGS. 1b and 1c) has a predetermined value, typically zero. The apex angle $\alpha_3$ of prism 220 is chosen so that the principal output beams have a predetermined angle of divergence or convergence, typically zero.

The remaining description of the second embodiment is the same as corresponding portions of the description given for the first variant of the first embodiment.

Reference is now made to FIG. 2b, which depicts in diagrammatic form the first variant of the second embodiment of the present invention. The first variant of the second embodiment is from the second category of embodiments wherein the effects of lateral shear of the type $S_a$ on the efficiency of transformation are either reduced or substantially eliminated. The apparatus of the first variant of the second embodiment in FIG. 2b comprises many of the same elements as the first variant of the first embodiment in FIG. 1b, the elements of the first variant of the second embodiment performing like operations as like denoted elements in the first variant of the first embodiment.

The description of light beam 41 for the first variant of the second embodiment is the same as that for the description of light beam 41 for the second embodiment. Principal optical elements in the first variant of the second embodiment different from the elements of the first variant of the first embodiment are birefringent prisms 320 and 420 shown in FIG. 2b, birefringent prisms 320 and 420 typically made of the same birefringent material such as birefringent prism 220 of the first variant of the first embodiment.

The optical axis 321 of birefringent prism 320 is orientated at an angle of 90° to the plane of FIG. 2b, the same as for birefringent prism 220 of the first variant of the first embodiment and the optical axis 421 of birefringent prism 420 is orientated parallel to the plane of FIG. 2b and substantially perpendicular to the direction of propagation of the optical beams propagating in birefringent prism 420, birefringent prisms 320 and 420 comprising negative uniaxial crystals. The apex angle $\alpha_8$ of birefringent prism 320 and the apex angle $\alpha_9$ of birefringent prism 420 are chosen such that the principal output beams, beams 192, 193, 194, and 195 (as shown in FIGS. 1b and 1c) following prism 420, have a predetermined spatial separation, typically zero, and have a predetermined angle of divergence or convergence, typically zero.

The remaining description of the first variant of the second embodiment is the same as corresponding portions of the description given for the second embodiment.

Figure 2C:
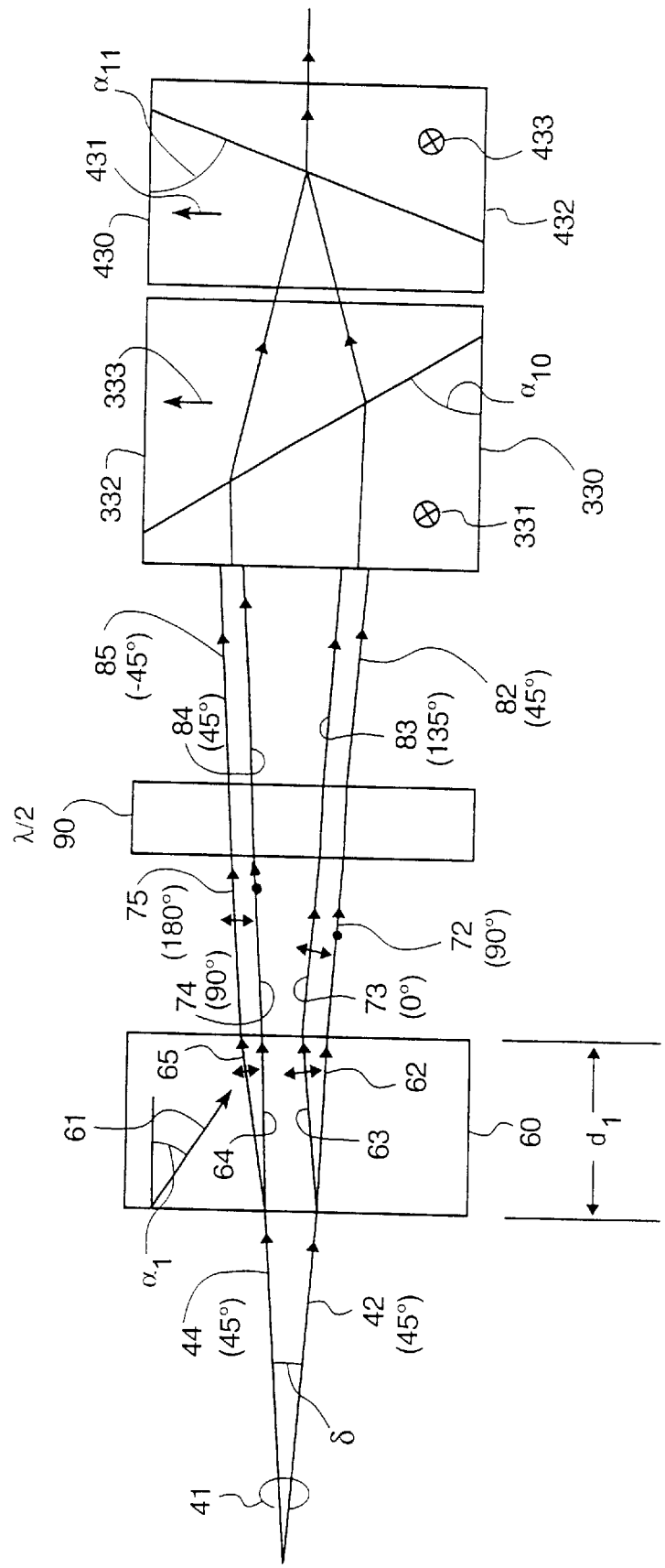

Reference is now made to FIG. 2c, which depicts in diagrammatic form the second variant of the second embodiment of the present invention. The second variant of the second embodiment is from the second category of embodiments wherein the effects of lateral shear of the type $S_a$ on the efficiency of transformation are either reduced or substantially eliminated. The apparatus of the second variant of the second embodiment in FIG. 2c comprises many of the same elements as the fourth variant of the first embodiment in FIG. 1e, the elements of the second variant of the second embodiment performing like operations as like denoted elements in the fourth variant of the first embodiment.

The description of light beam 41 for the second variant of the second embodiment is the same as that for the description of light beam 41 for the second embodiment. Principal optical elements in the second variant of the second embodiment different from the elements of the fourth variant of the first embodiment are Wollaston prisms comprising birefringent prisms 330 and 332 and birefringent prisms 430 and 432. The optical axes of the two components of Wollaston prism comprising prisms 330 and 332 are orientated the same as optical axes of the two components of Wollaston prism comprising prisms 230 and 232 of the fourth variant of the first embodiment, corresponding components of Wollaston prism comprising prisms 230 and 232 and of Wollaston prism comprising prisms 330 and 332 comprising the same birefringent material. The components of Wollaston prism comprising prisms 430 and 432 comprise the M same birefringent material as the components of Wollaston prism comprising prisms 230 and 232. The angle $\alpha_{10}$ of Wollaston prism comprising prisms 330 and 332 and the angle $\alpha_{11}$ of Wollaston prism comprising prisms 430 and 432 are chosen such that the principal output beams, beams 192, 193, 194, 195 (as shown in FIGS. 1b and 1c) following prisms 430 and 432, have a predetermined spatial separation, typically zero, and have a predetermined angle of divergence or convergence, typically zero.

The remaining description of the second variant of the second embodiment is the same as corresponding portions of the description given for the second embodiment.

It will be apparent to those skilled in the art that the $S_a$ type lateral shear compensating/reduction feature of the second embodiment and variants thereof can be incorporated into different ones of the disclosed embodiments and variants thereof of the present invention without departing from the scope and spirit of the present invention.

Figure 3A:
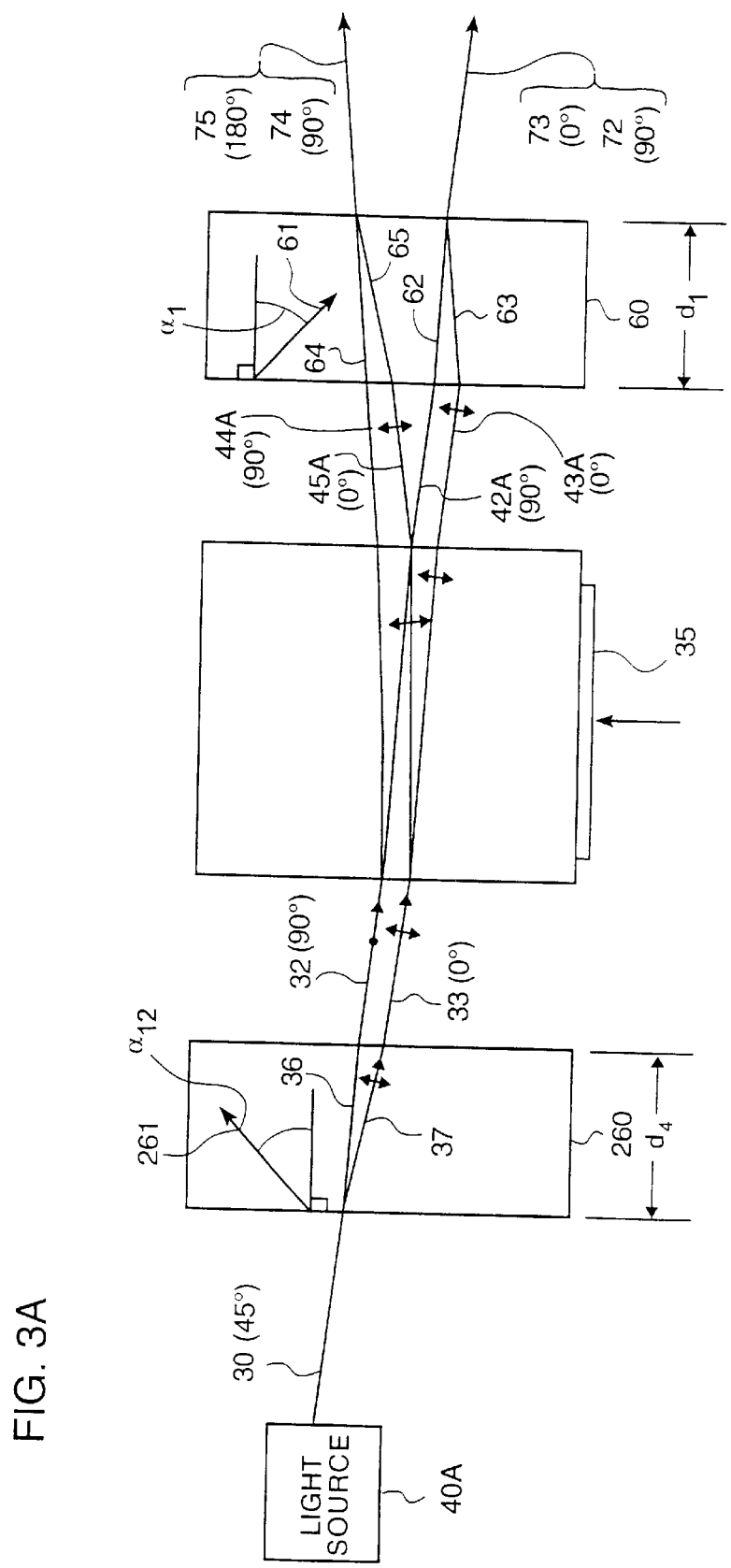
FIGS. 3a–3b depict in schematic form the third embodiment and variant thereof of the present invention from the third category of embodiments and variants with FIG. 3a depicting in schematic form the third embodiment.

Reference is now made to FIG. 3a, which depicts in diagrammatic form the third embodiment of the present invention. The third embodiment is from the third category of embodiments wherein the effects of lateral shear of the type $S_b$ on the efficiency of transformation are either reduced or substantially eliminated. The apparatus of the third embodiment in FIG. 3a comprises many of the same elements as the first variant of the first embodiment in FIG. 1b, the elements of the third embodiment performing like operations as like denoted elements in the first variant of the first embodiment.

The description of the light beams for the third embodiment is similar to the description of the light beams in the first embodiment. A principal optical element in the third embodiment different from the elements of the first variant of the first embodiment is a phase retardation plate 260 shown in FIG. 3a, typically made of the same birefringent material as phase retardation plate 60. The optical axis 261 of the phase retardation plate 260 is orientated at an angle $\alpha_{12}$ with respect to a normal to the entrance facet of phase retardation plate 260 as illustrated in FIG. 3a, orthogonal to a normal to the plane of FIG. 3a, and the angle between optical axis 261 and optical axis 61 of phase retardation plate 60 typically is nominally 90°.

Light source 40a generates an input beam 30 having a polarization of 45°. Upon propagating through retardation plate 260, beam 30 separates into extraordinarily polarized beam 37 and ordinarily polarized beam 36, which exit retardation plate 260 as beam 33 and beam 32, respectively. Retardation plate 260 thereby introduces a lateral shear between beams 32 and 33 as a result of the difference between the directions of the energy flux vector and the wave front vector for the extraordinarily polarized beam. These beams then propagate though an acousto-optic Bragg cell 35, which diffracts half of beams 32 and 33 into frequency-shifted beams 44a and 45a. The undiffracted halves of beams 32 and 33 emerge from Bragg cell 35 as beams 42a and 43a. Beams 42a, 43a, 44a, and 45a enter retardation plate 60 forming beams 62, 63, 64, and 65 as in the embodiment described in FIG. 1a. The thickness $d_4$ of phase retardation plate 260 is chosen so that the lateral shear introduced by phase retardation plate 260 exactly compensates for the lateral shear $S_b$ produced by retardation plate 60. Thus, beams 72 and 73 and beams 74 and 75 completely overlap one another.

The third embodiment in addition to substantially compensating for the lateral shear $S_b$ produced by retardation plate 60 also substantially eliminates the first order sensitivity of the relative phases of output beams 72 and 73 and output beams 74 and 75 to changes in the orientation of the input beam 30 in the plane of FIG. 3a.

The remaining discussion of the third embodiment is the same as corresponding portions of the description given for the first variant of the first embodiment.

Figure 3B:
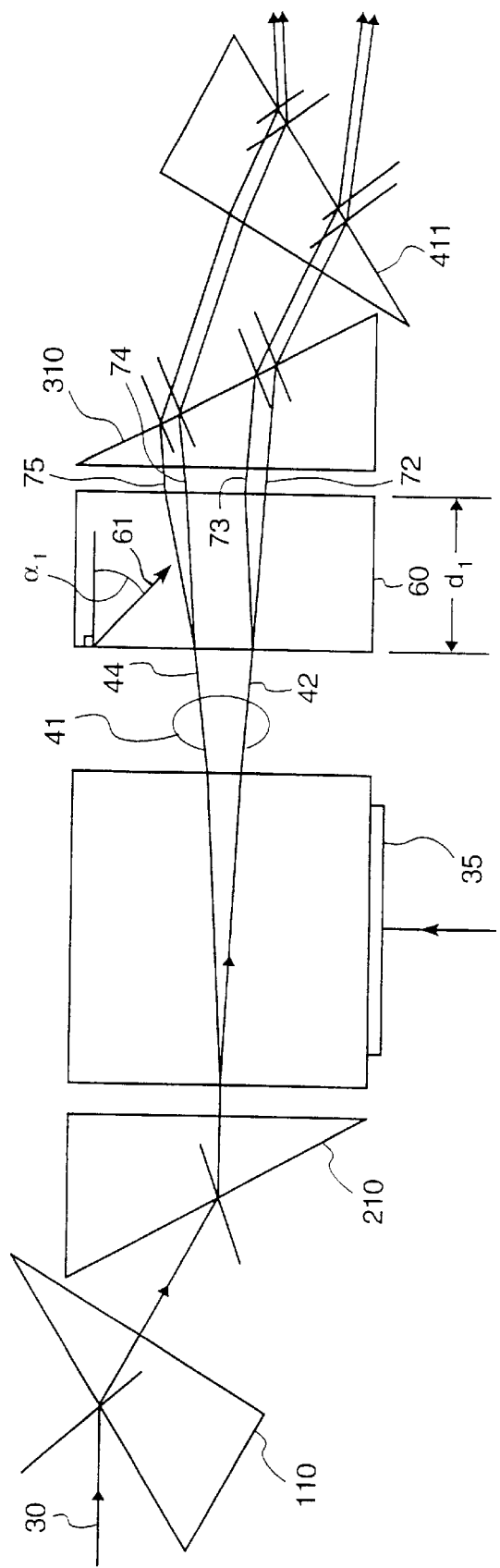

Reference is now made to FIG. 3b, which depicts in diagrammatic form the first variant of the third embodiment of the present invention. The first variant of the third embodiment is from the third category of embodiments wherein the effects of lateral shear of the type $S_b$ on the efficiency of transformation are either reduced or substantially eliminated. The apparatus of the first variant of the third embodiment in FIG. 3b comprises many of the same elements as the first variant of the first embodiment in FIG. 1b, the elements of the first variant of the third embodiment performing like operations as like denoted elements in the first variant of the first embodiment.

The description of light beam 30 for the first variant of the third embodiment is the same as that for the description of light beam 30 for the third embodiment. A set of optical elements in the first variant of the third embodiment different from the elements of the first variant of the first embodiment are prisms 110, 210, 310, and 410 shown in FIG. 3b, typically of the non birefringent type. Prisms 110 and 210 are used as beam expanders in the plane of FIG. 3b before Bragg cell 35 and prisms 310 and 410 are used as beam contractors in the plane of FIG. 3b after phase retardation plate 60. The net result is a reduction in the lateral shear of the $S_b$ type by a factor equal to the reduction factor of the beam contraction produced by prisms 310 and 410, the beam expansion factor of the beam expansion produced by prisms 110 and 210 being the reciprocal of the reduction factor of the beam contraction produced by prisms 310 and 410.

The remaining discussion of the third embodiment is the same as corresponding portions of the description given for the first variant of the first embodiment.

It will be apparent to those skilled in the art that the $S_b$ type lateral shear compensating/reduction feature of the third embodiment and variant thereof can be incorporated into different ones of the disclosed embodiments and variants thereof of the present invention without departing from the scope and spirit of the present invention.

Figure 4:
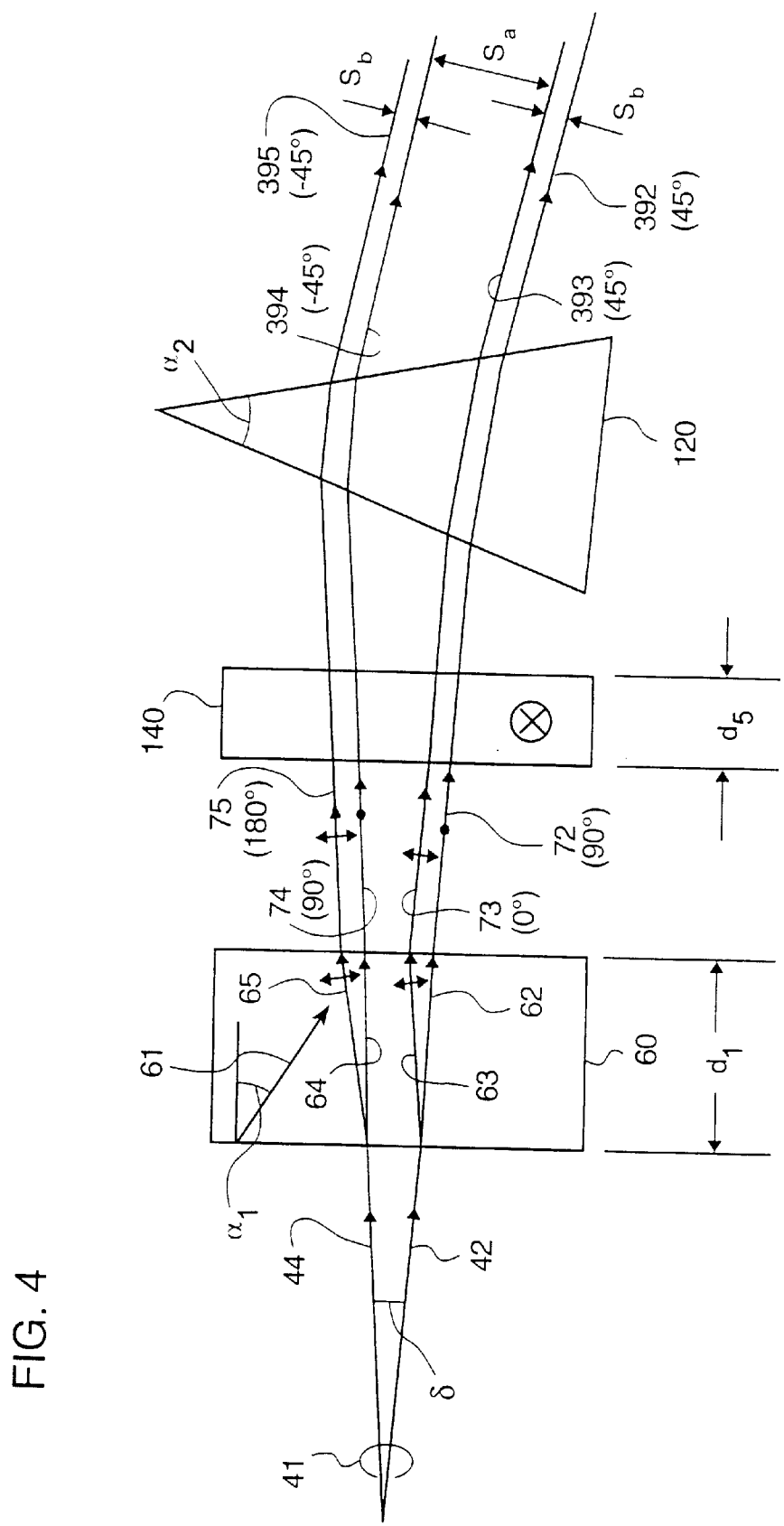
FIG. 4 depicts in schematic form the fourth embodiment of the present invention from the fourth category of embodiments and variants.

Reference is now made to FIG. 4, which depicts in diagrammatic form the fourth embodiment of the present invention. The fourth embodiment is from the fourth category of embodiments wherein the relative phase of the principal output beam components relative to the relative phase of the different frequency components of the input beam are temperature compensated for changes in temperature of the phase retardation plate(s) in the apparatus. The apparatus of the fourth embodiment in FIG. 4 comprises many of the same elements as the first embodiment in FIG. 1a, the elements of the fourth embodiment performing like operations as like denoted elements in the first embodiment.

The description of light beam 41 for the fourth embodiment is the same as that for the description of light beam 41 for the first embodiment. A principal optical element in the fourth embodiment different from the elements of the first variant of the first embodiment is a phase retardation plate 140 shown in FIG. 4, which is made of the same birefringent material as phase retardation plate 60. In other embodiments, it is possible that retardation plate 140 is made of a material different from retardation plate 60. The optical axis of a phase retardation plate 140 is orientated orthogonal to the optical axis of phase retardation plate 60 and substantially orthogonal to the directions of propagation of the beams in phase retardation plate 140. The thickness $d_5$ of phase retardation plate 140 is chosen so that changes in the phase differences between beams 72 and 73 and beams 74 and 75 that arise due to temperature changes in retardation plate 60 are compensated by the phase differences between beams 72 and 73 and beams 74 and 75 imparted by retardation plate 140. For relatively small angles of δ(e.g., on the order of 3.5 mrad), this condition is satisfied when $d_5$ satisfies Equation (11):

$$\frac{\partial}{\partial T}\left[(n_o - n)d_1 \frac{2\pi}{\lambda_0} + (n_o - n_e)d_5 \frac{2\pi}{\lambda_0}\right] = 0 \quad (11)$$

where T is temperature, $\lambda_0$ is the wavelength of beam 41, and n is the index of refraction given by Eq. (1) for the extraordinarily polarized beams in retardation plates 60.

The remaining discussion of the fourth embodiment is the same as corresponding portions of the description given for the first embodiment.

It will be apparent to those skilled in the art that the temperature compensating feature of the fourth embodiment can be incorporated into different ones of the disclosed embodiments and variants thereof of the present invention without departing from the scope and spirit of the present invention.

It will also be apparent to those skilled in the art that in alternative variants different orientations of the optic axis in retardation plate 140 are possible. For example, retardation plate 140 can be replaced with a second retardation plate that is identical to phase retardation plate 60 except that it is rotated by an angle of 90° about the direction of propagation of input beam 41 so that its optic axis is contained in a plane perpendicular to the plane of FIG. 4. For the alternative variant of the example, it will be apparent to those skilled in the art that the relative phases of output beams 392 and 393 and output beams 394 and 395 are sensitive in first order to changes in the orientation of input beam 41 in a plane orthogonal to the plane of FIG. 4. It will be also evident to those skilled in the art that when the alternative variant of the example is employed twice in the third embodiment, once to compensate for thermal effects of birefringent plate 60 and once to compensate for the thermal effects of birefringent plate 260 (see FIG. 3a), the sensitivity of the relative phases of output beams corresponding to beams 72 and 73 and output beams 74 and 75 to changes in the orientation of input beam 30 in a plane orthogonal to the plane of FIG. 3a is substantially eliminated, the optical axes of the two thermal compensating retarding plates being substantially orthogonal.

It will be further evident to those skilled in the art that each of the embodiments and variants thereof of the present invention may be configured to receive source beams with converging directions of propagation and produce either output beams with diverging directions of propagation or output beams with parallel directions of propagation according to the requirements of the end use application without departing from the spirit and scope of the present invention.

Figure 5:
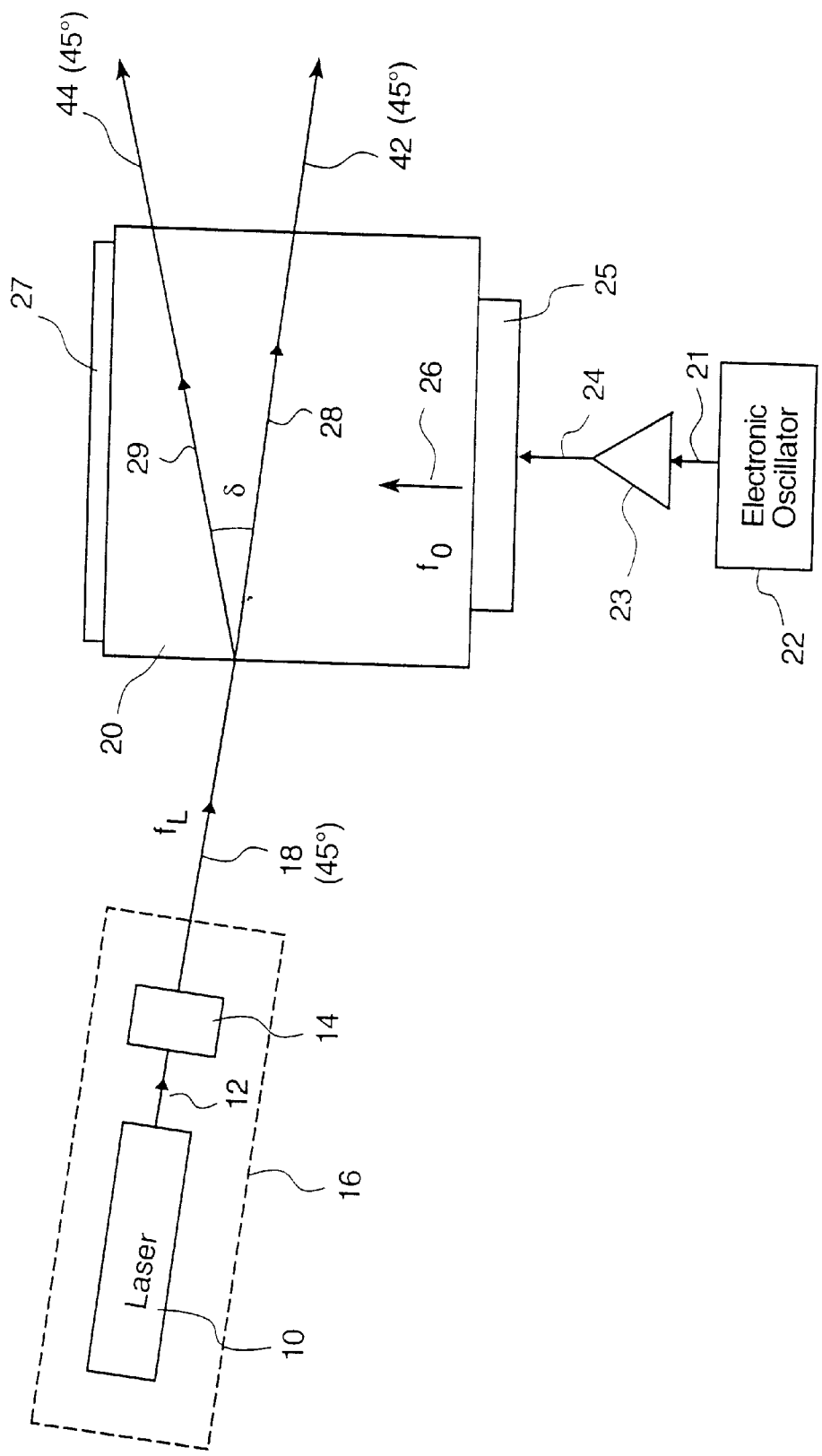
FIG. 5 depicts in schematic form an embodiment of a light source for use with the embodiments in the FIGS. 1–4.

As would be known to those of skill in the art, light source 40 for producing diverging input beams 42 and 44 (as shown in FIG. 1a) can include many different embodiments. One such embodiment is shown in FIG. 5. A laser 10 provides a beam 12 of optical energy, which has a single, stabilized frequency and is linearly polarized. Laser 10 can be any of a variety of lasers. For example, it can be a gas laser, e.g. a HeNe, stabilized in any of a variety of conventional techniques known to those skilled in the art to produce beam 12, see for example, T. Baer et al., "Frequency stabilization of a 0.633 μm He-Ne-longitudinal Zeeman laser," *Applied Optics*, 19(18), 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, light source 10 can be a diode laser frequency stabilized by one of a variety of conventional techniques known to those skilled in the art to produce beam 12, see for example, T. Okoshi and K. Kikuchi, "Frequency Stabilization of Semiconductor Lasers for Heterodyne-Type Optical Communication Systems," *Electronic Letters*, 16(5), 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics*, QE-19 (10), 1514–1519 (1983).

The specific device used for source 10 will determine the diameter and divergence of beam 12. For some sources, e.g. a diode laser, it is necessary to use conventional beam shaping optics 14, e.g. a conventional microscope objective, to provide input beam 18 with suitable diameter and divergence for the elements that follow. When laser 10 is a HeNe laser, for example, beam shaping optics 14 may not be required. The elements 10 and 14 are shown in dashed box 16 which represents the source of the input beam 18 and, for this embodiment and others with analogous features, includes well-known alignment means for spatially and angularly positioning input beam 18. Such alignment means could, for example, comprise precision micro-manipulators and steering mirrors. The input beam 18 has one stabilized frequency $f_L$ and is linearly polarized. The polarization orientation, by way of example, is typically 45° to the plane of FIG. 5.

An electrical oscillator 22 provides a frequency stabilized electrical signal 21 of frequency $f_o$ to a conventional power amplifier 23. The electrical output 24 of the power amplifier 32 drives an array of conventional piezoelectric transducers 34 affixed to a Bragg cell 20. The array of piezoelectric transducers 25 generates an acoustic wave 26 within Bragg cell 20. Conventional techniques known to those skilled in the art of acousto-optical modulation are used to absorb, by absorber 27, the acoustic wave 26 that passes through to the walls of the acousto-optical Bragg cell 20. The acoustic wave diffracts a portion of input beam 18 into a diffracted and frequency-shifted beam 29, which diverges within Bragg from beam 28, the remaining port-on of input beam 18. Upon exiting Bragg cell 20, beams 28 and 29 form beams 42 and 44, respectively, which are two diverging beams having substantially identical polarizations and different frequencies. As described above, beams 42 and 44 propagate into at least one retardation plate and a birefringent prism (and possibly additional optics) to produce two substantially coextensive and collinear beams having substantially orthogonal polarizations and different frequencies.

The system described above can be used in a wide range of interferometric measuring systems, one such example being the distance measuring interferometry system 501 shown in FIG. 6. The system described above (depicted as system 500) produces two substantially coextensive and collinear, frequency shifted beams 502 and 504 having substantially orthogonal polarizations. In particular, beam 502 is polarized within the plane of FIG. 6 (i.e., 0°) and has a frequency $f_1$ and beam 504 is polarized substantially orthogonal to the plane of FIG. 6 (i.e., 90°) and has a frequency $f_2$. Beams 502 and 504 are incident on a polarizing beam splitter 506, which reflects beam 504 to a first retroreflector 508 and transmits beam 502 through a quarter wave plate 505 and onto a stage mirror 507. The stage mirror is movable along the propagation direction of beam 502 and reflects beam 502 back through quarter wave plate 505 and back to polarizing beam splitter 506. The double pass through quarter wave, plate 505 and the reflection from stage mirror 507 rotate the polarization of beam 502 to 90° so that beam splitter 506 reflects beam 502 toward a second retroreflector 509, which in turn reflects the beam back to beam splitter 506. Then, beam splitter 506 reflects beam 502 back through quarter waveplate 505 and toward stage mirror 507.

Once again stage mirror reflects beam 502 back through the quarter waveplate toward the beam splitter. The second double pass through quarter waveplate 505 and the reflection from stage mirror 502 return the polarization of beam 502 to 0°. Thus, beam splitter 506 now transmits multiply-reflected beam 502 and recombines it with beam 504, which is reflected by beam splitter 506 after being reflected back to beam splitter 506 by retroreflector 508. The recombined beams then enter into a mixing polarizer 510 (e.g., a polarizer oriented at 45°) and the intensity of the resultant optical signal 511 is measured by detector 512. The frequency of the intensity signal measured by detector 512 is equal to the difference in frequency between beams 502 and 504 plus a term associated with the speed of movable stage mirror 507. Detector 512 sends a signal 514 based on the intensity measurement to electronics 516, which also receives a signal 518 from system 500 indicative of the frequency difference and relative phase of beams 502 and 504. From signals 514 and 518 electronics 516 determines changes in distance to stage mirror 507. In some applications, the stage mirror is mounted onto wafer processing stage so that the interferometry apparatus 501 measures the precise position of a wafer being processed.

As is well known in the art, apparatus 501 can be modified in many ways. In particular, the apparatus can include similar sets of additional optics to provide distance measurements along multiple axes. The efficiency provided by system 500 for producing beams 502 and 504 insures that there is sufficient energy to make these measurements along multiple axes.

OTHER EMBODIMENTS

Other embodiments are also in the scope of the invention. For example, elements such as the retardation plates and birefringent prisms can be integral with one another rather than being separated from one another. Furthermore, rather than using retardation plates having parallel entry and exit faces, the invention can include any retarder element made from a birefringent material. For example, the invention can include a retarder element made from a birefringent material having a varying thickness. In this case, one can translate the position of the retarder element so that beams propagating through the retarder element propagate through an optimum thickness. Also, in other embodiments the shape and orientation of the retarder element can produce the desired retardances by causing internal reflections of the beams being retarded within the retarder element.

Other aspects, advantages, and modifications are within the scope of the following claims.

What is claimed is:

1. A distance measuring interferometry system comprising:
   a source which during operation generates two nonparallel propagating source beams;
   a retardation plate positioned to receive the two nonparallel propagating source beams and convert them into two nonparallel propagating output beams that are polarized substantially orthogonal to one another;
   an interferometer that directs at least a portion of one of the output beams along a reference optical path and at least a portion of the other of the output beams along a variable optical path and thereafter combines the portions of the output beams into a signal beam; and
   a detector for measuring an intensity of the signal beam.

2. The interferometry system of claim 1, wherein the detector comprises a polarizer for producing a polarized signal beam having a polarization different from the polarizations of the output beams, and wherein the intensity of the signal beam measured by the detector is an intensity of the polarized signal beam.

3. The interferometry system of claim 1 further comprising measurement electronics for determining changes in the variable optical path from the measured intensity.

4. A distance measuring interferometry system comprising:
   a source which during operation generates first and second source beams propagating along nonparallel directions;
   a retarder element positioned to receive the first and second source beams and to transform each of the first and second source beams into an ordinarily-polarized beam and an extraordinarily-polarized beam, wherein immediately before exiting the retarder element, the ordinarily-polarized and extraordinarily-polarized beams generated from the first source beam differ in optical phase by a first amount and the ordinarily-polarized and extraordinarily-polarized beams generated from the second source beam differ in optical phase by a second amount and wherein the first and second amounts differ by a value that is substantially equal to $\pi$ radians (modulo $2\pi$), and wherein upon exiting the retarder element the overlapping portions of the ordinarily-polarized and extraordinarily-polarized beams produced from the first source beam form a first output beam and the overlapping portions of the ordinarily-polarized and polarized beams produced from the second source beam form a second output beam;
   an interferometer that directs at least a portion of one of the output beams along a reference optical path and at least a portion of the other of the output beams along a variable optical path and thereafter combines the portions of the output beams into a signal beam; and
   a detector for measuring an intensity of the signal, beam.

5. The interferometry system of claim 4, wherein the detector comprises a polarizer for producing a polarized signal beam having a polarization different from the polarizations of the output beams, and wherein the intensity of the signal beam measured by the detector is an intensity of the polarized signal beam.

6. The interferometry system of claim 4 further comprising measurement electronics for determining changes in the variable optical path from the measured intensity.

7. A distance measuring interferometry system comprising:
   a source which during operation generates first and second source beams propagating along nonparallel directions;
   a retarder element positioned to receive the first and second source beams and transform each of the first and second source beams into overlapping ordinarily-polarized and extraordinarily-polarized beams, wherein upon exiting the retarder element the overlapping portions of the ordinarily-polarized and extraordinarily-polarized beams produced from the first source beam form a first output beam and the overlapping portions of the ordinarily-polarized and extraordinarily-polarized beams produced from the second source beam form a second output beam and wherein the first and second output beams are polarized substantially orthogonal to one another;
   an interferometer that directs at least a portion of one of the output beams along a reference optical path and at least a portion of the other of the output beams along a variable optical path and thereafter combines the portions of the output beams into a signal beam; and a detector for measuring an intensity of the signal beam.

8. The interferometry system of claim 7, wherein the detector comprises a polarizer for producing a polarized signal beam having a polarization different from the polarizations of the output beams, and wherein the intensity of the signal beam measured by the detector is an intensity of the polarized signal beam.

9. The interferometry system of claim 7 further comprising measurement electronics for determining changes in the variable optical path from the measured intensity.

10. A distance measuring interferometry system comprising:

a retarder element positioned to receive two nonparallel propagating input beams that are polarized substantially parallel to one another and convert them into two nonparallel propagating output beams that are polarized substantially orthogonal to one another;

a birefringent prism positioned to receive the two nonparallel propagating output beams from the retarder element and convert them into two substantially parallel optical beams that are polarized substantially orthogonal to one another;

an interferometer that directs at least a portion of one of the output beams along a reference optical path and at least a portion of the other of the output beams along a variable optical path and thereafter combines the portions of the output beams into a signal beam; and a detector for measuring an intensity of the signal beam.

11. The interferometry system of claim 10, wherein the detector comprises a polarizer for producing a polarized signal beam having a polarization different from the polarizations of the output beams, and wherein the intensity of the signal beam measured by the detector is -an intensity of the polarized signal beam.

12. The interferometry system of claim 10 further comprising measurement electronics for determining changes in the variable optical path from the measured intensity.

13. A distance measuring interferometry system comprising:

a source which during operation generates two nonparallel propagating source beams that are polarized substantially parallel to one another;

a retarder plate positioned to receive the two nonparallel propagating source beams and produce two nonparallel propagating intermediate beams, wherein the retarder plate has a thickness, birefringence, and orientation that causes the two nonparallel propagating intermediate beams to be polarized substantially orthogonal to one another upon exiting the retarder plate;

a birefringent prism positioned to receive the two nonparallel propagating intermediate beams and produce two output beams that are polarized substantially orthogonal to one another, wherein the prism has a shape and a birefringence that causes the two output beams to be substantially parallel to one another, an interferometer that directs at least a portion of one of the output beams along a reference optical path and at least a portion of the other of the output beams along a variable optical path and thereafter combines the portions of the output beams into a signal beam; and a detector for measuring an intensity of the signal beam.

14. The interferometry system of claim 13, wherein the detector comprises a polarizer for producing a polarized signal beam having a polarization different from the polarizations of the output beams, and wherein the intensity of the signal beam measured by the detector is an intensity o[0086] the polarized signal beam.

15. The interferometry system of claim 13 further comprising measurement electronics for determining changes in the variable optical path from the measured intensity.

* * * * *

UNITED STATES PATENT AND TRADEMARK OFFICE
CERTIFICATE OF CORRECTION

PATENT NO. : 6,452,682 B2
DATED : September 17, 2002
INVENTOR(S) : Peter J. De Groot and Henry A. Hill It is certified that error appears in the above-identified patent and that said Letters Patent is hereby corrected as shown below:

Title page,
Item [56], References Cited, U.S. PATENT DOCUMENTS, add
"3,572,895 A    03/1971    Schmidt et al."

Column 1,
Line 17, replace "Laser" with -- laser --.

Column 4,
Line 29, replace "bea" with -- beam --.

Column 8,
Line 38, replace "acoustc-optical" with -- acousto-optical --.
Line 49, replace "α" with -- $\alpha_1$ --.

Column 9,
Line 1, replace "11" with -- $n$ --.
Line 27, replace "$TeO_3$" with -- $TeO_2$ --.

Column 12,
Line 4, replace "$\phi$" with -- $\phi$ -- (both occurrences).
Line 14, replace "$\phi$" with -- $\phi$ --.
Line 30, replace "φ" with -- $\vartheta$ --.

Column 13,
Line 24, replace ":" with -- , --.

Column 17,
Line 16, replace "range" with -- angle --.

Column 18,
Line 58, delete "M".

Column 22,
Line 36, replace "port-on" with -- portion --.

Column 24,
Line 38, replace "signal," with -- signal --.

Column 25,
Line 37, replace "-an" with -- an --.

UNITED STATES PATENT AND TRADEMARK OFFICE
CERTIFICATE OF CORRECTION

PATENT NO.   : 6,452,682 B2
DATED        : September 17, 2002
INVENTOR(S)  : Peter J. De Groot and Henry A. Hill It is certified that error appears in the above-identified patent and that said Letters Patent is hereby corrected as shown below:

<u>Column 26,</u>
Line 33, replace "o[0086]" with -- of --.

Signed and Sealed this

Twentieth Day of May, 2003

JAMES E. ROGAN
*Director of the United States Patent and Trademark Office*